United States Patent [19]
Yasuda et al.

[11] Patent Number: 5,617,995
[45] Date of Patent: Apr. 8, 1997

[54] COMBUSTION HEATER

[75] Inventors: Masanori Yasuda, Okazaki; Sadahisa Onimaru, Chiryu; Takashi Inoue, Okazaki; Hiroshi Okada, Kariya; Akikazu Kojima, Gamagori; Niro Takaki, Kariya, all of Japan

[73] Assignee: Nippon Soken Inc, Japan

[21] Appl. No.: 427,032

[22] Filed: Apr. 24, 1995

[30] Foreign Application Priority Data

| Apr. 22, 1994 | [JP] | Japan | 6-107494 |
| Sep. 6, 1994 | [JP] | Japan | 6-239401 |
| Nov. 11, 1994 | [JP] | Japan | 6-303108 |

[51] Int. Cl.$^6$ ........................ B60H 1/02
[52] U.S. Cl. ........................ 237/12.3 C
[58] Field of Search ............ 431/62, 63; 126/350 A, 126/351; 237/12.3 C

[56] References Cited

U.S. PATENT DOCUMENTS

| 4,538,985 | 9/1985 | Zwicker . | |
| 4,915,615 | 4/1990 | Kawamura et al. | 237/12.3 C |
| 5,088,918 | 2/1992 | Schaale et al. . | |
| 5,480,093 | 1/1996 | Tochizawa et al. | 237/12.3 C |

FOREIGN PATENT DOCUMENTS

| 60-29505 | 2/1985 | Japan . |
| 1262214 | 10/1989 | Japan . |
| 282007 | 3/1990 | Japan . |
| 371251 | 7/1991 | Japan . |
| 473503 | 3/1992 | Japan . |
| 4214105 | 8/1992 | Japan . |

Primary Examiner—Carroll B. Dority
Attorney, Agent, or Firm—Cushman Darby & Cushman, IP Group of Pillsbury Madison & Sutro LLP

[57] ABSTRACT

In a combustion heater, at the time of ignition, a fuel supply amount is increased in a stepwise fashion. On the other hand, at the time of extinction, the fuel supply amount is decreased in a stepwise fashion. The fuel supply amount is increased stepwise using different fuel increasing amounts or different fuel increasing periods, both depending on heat quantities generated by a burner at respective fuel increasing time points. At the time of extinction, the fuel supply amount and an air supply amount are both reduced to given values, respectively, and held at the given values for a given time period. After lapse of the given time period, the fuel supply amount is reduced to zero, while the air supply amount is held at the given value for a further given time period. The air supply amount is changed with a given time delay relative to a change of the fuel supply amount. The time delay may be adjusted depending on a temperature in the burner.

13 Claims, 20 Drawing Sheets

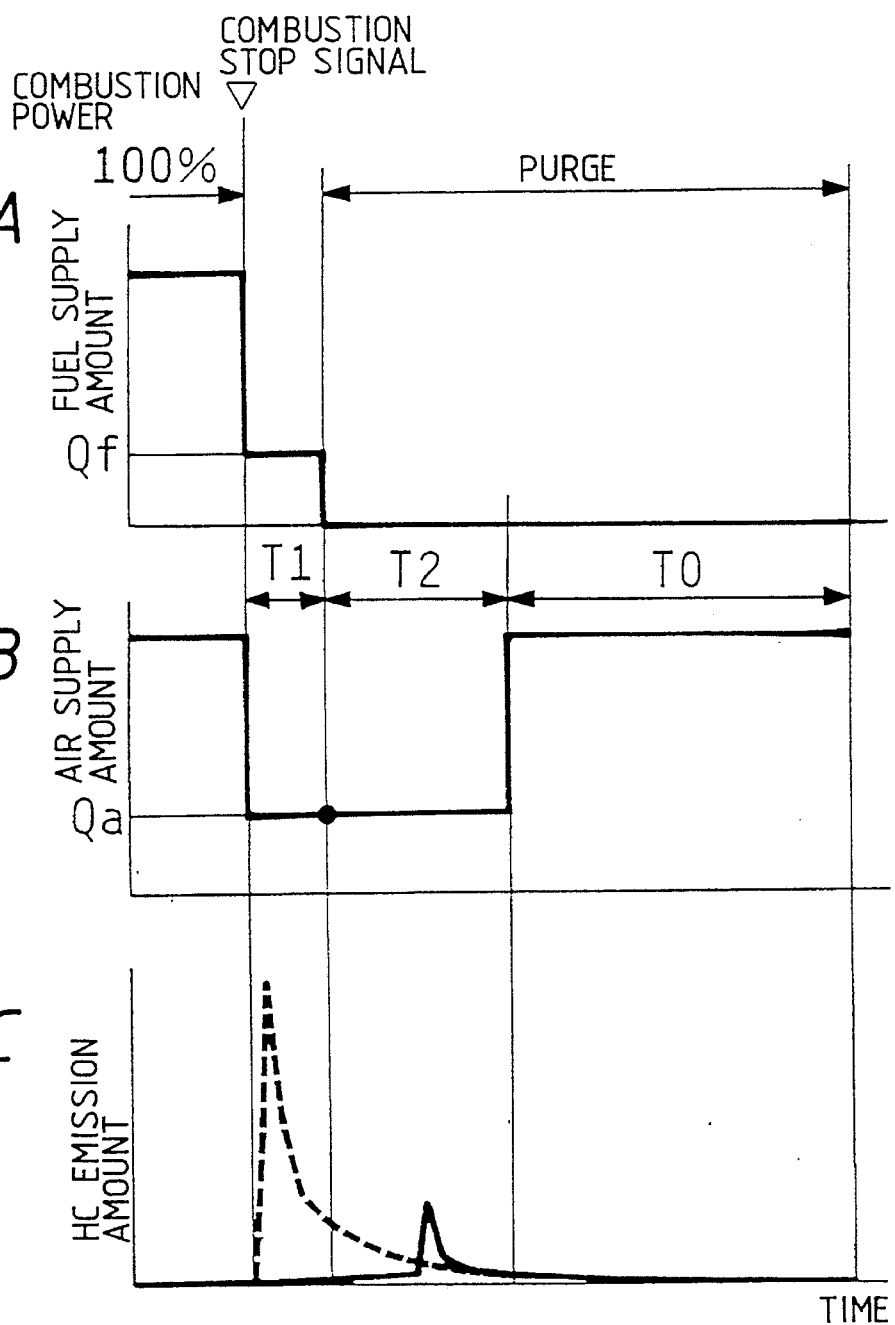

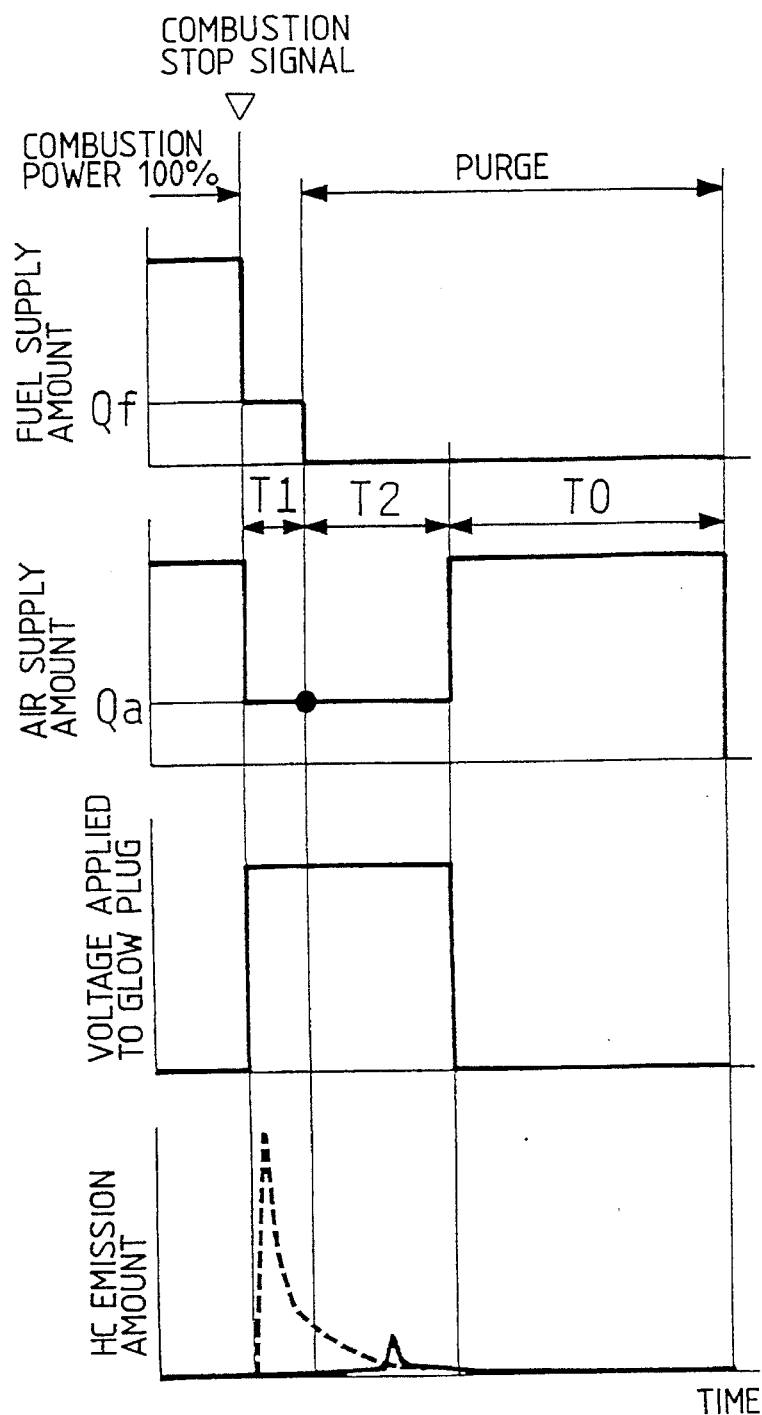

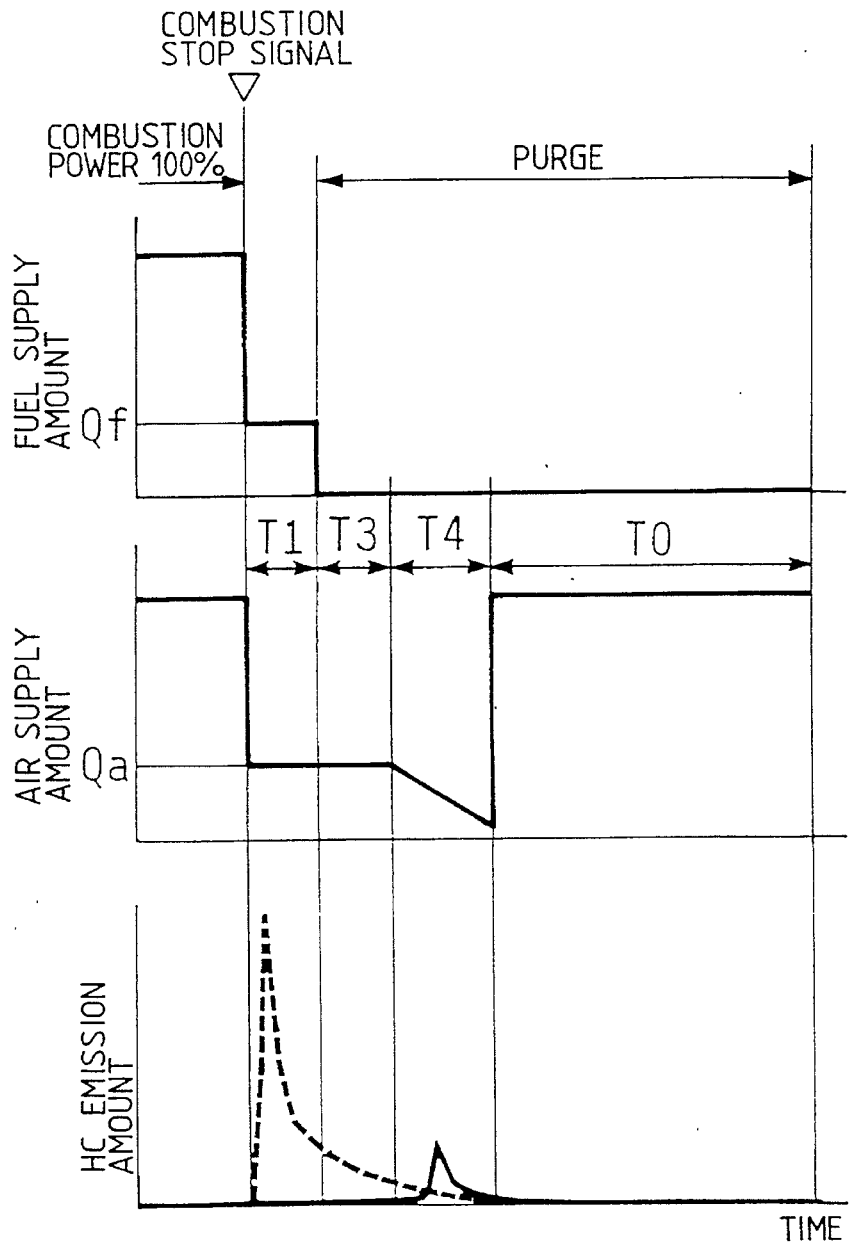

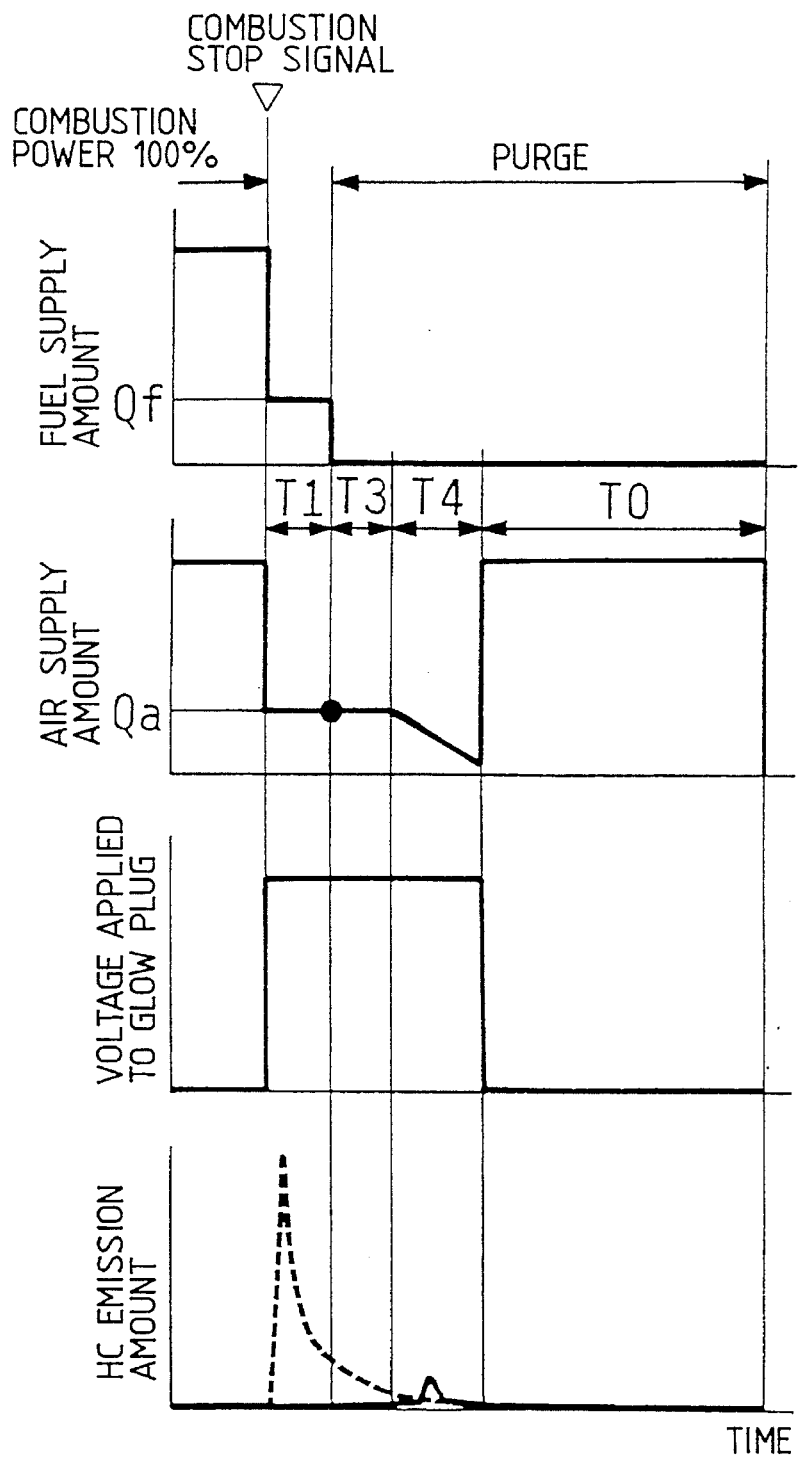

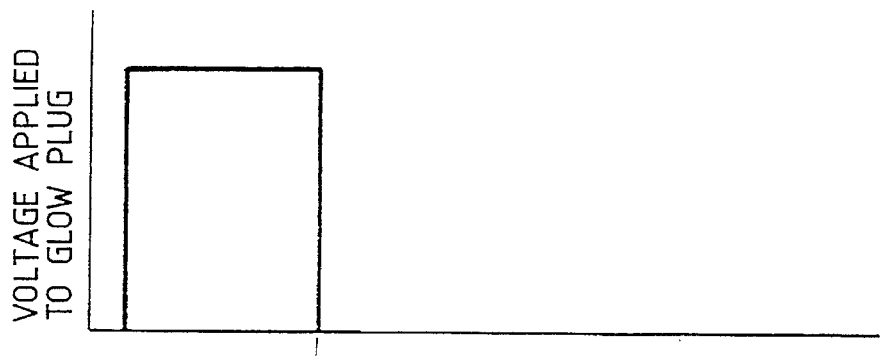
FIG. 14A
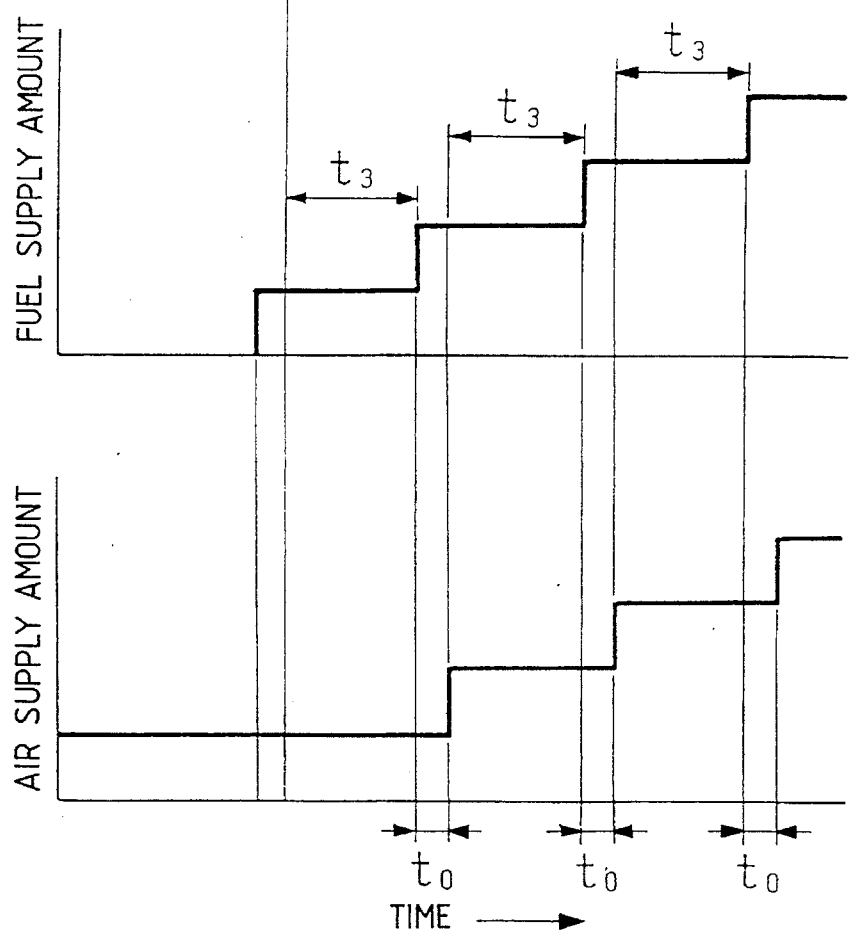
FIG. 14B
FIG. 14C

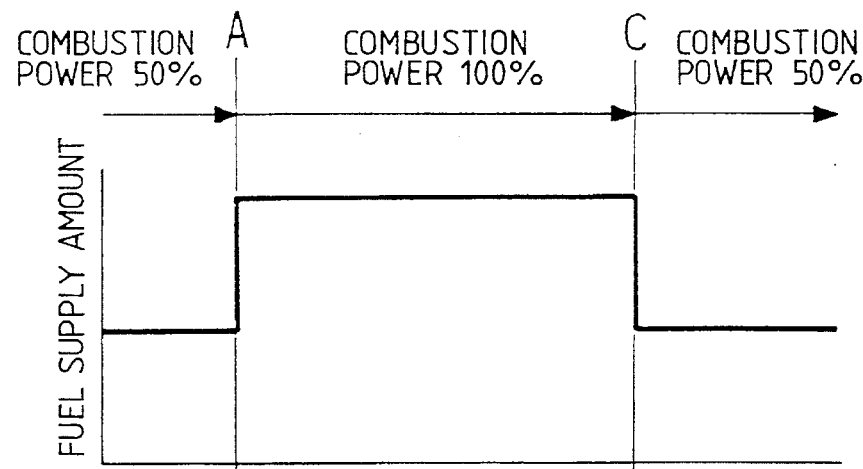
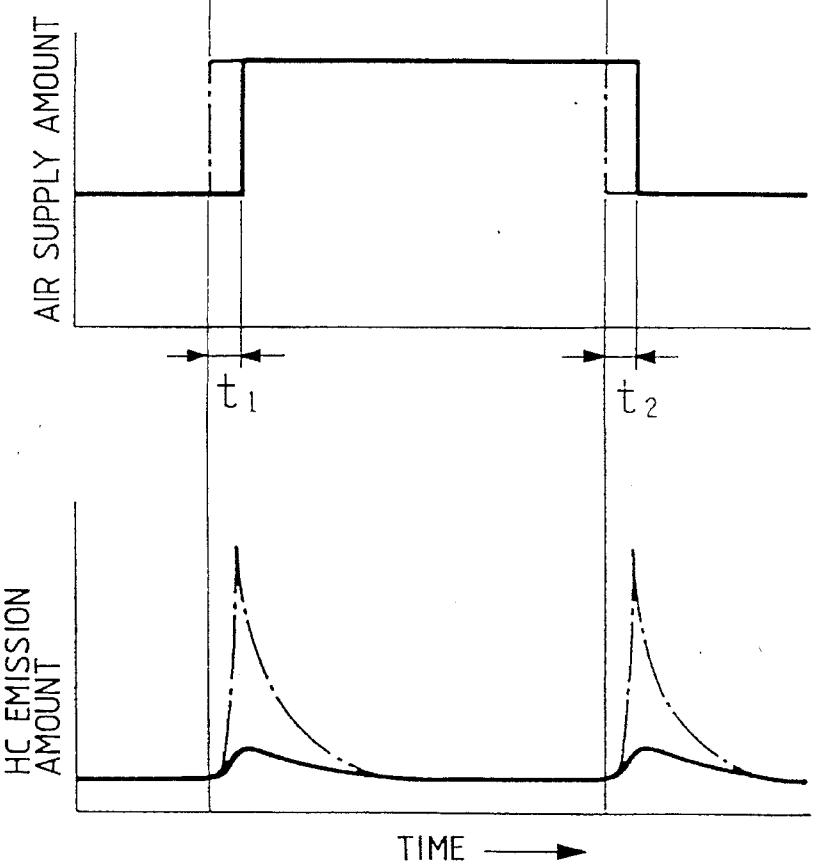

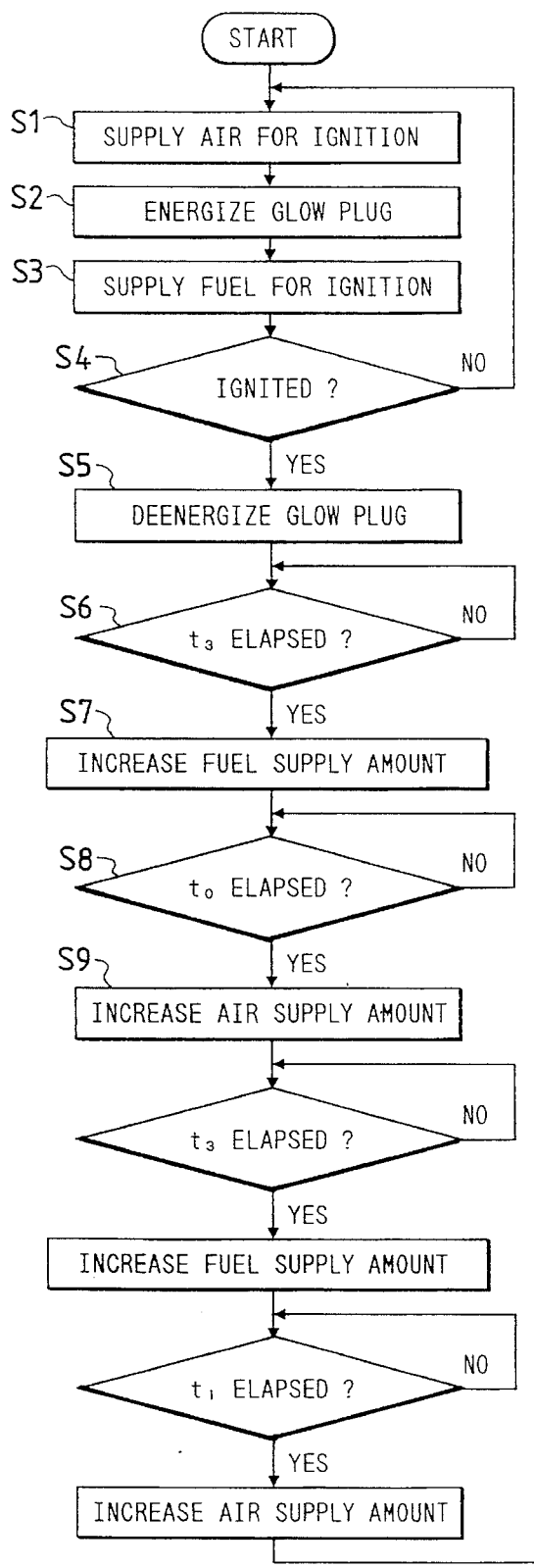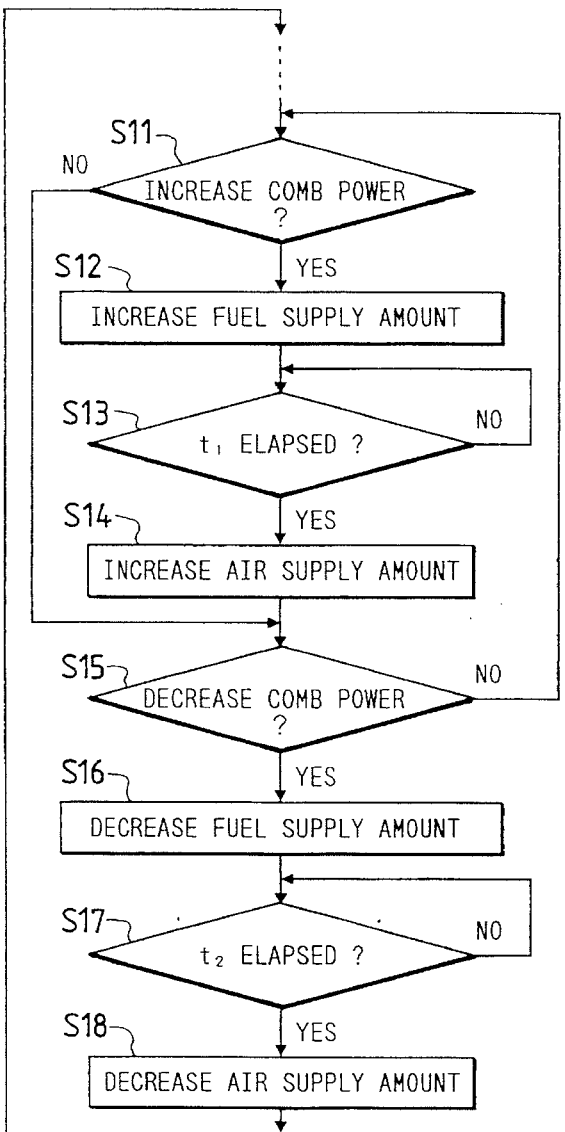
FIG. 16

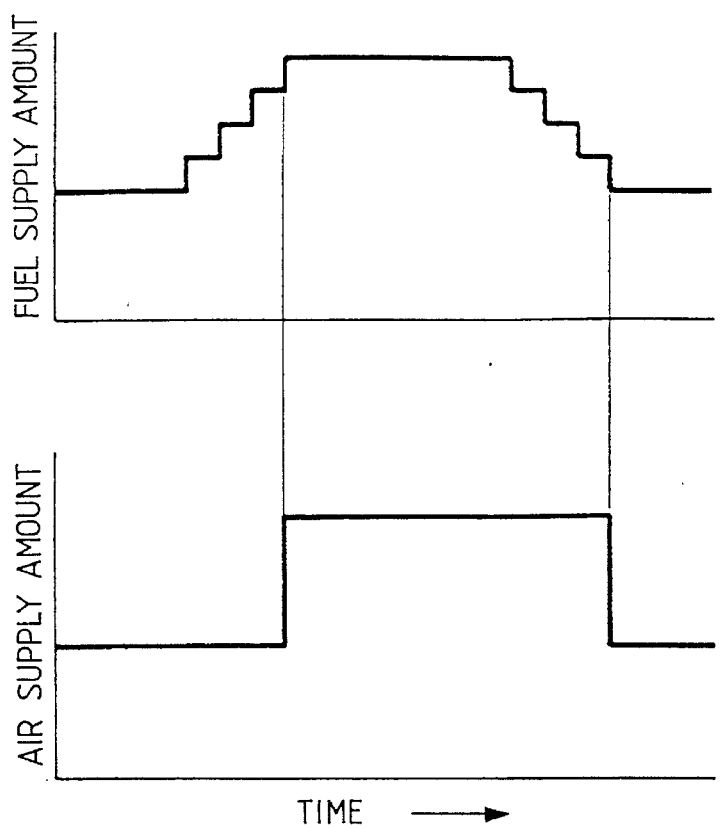
FIG. 19A
FIG. 19B
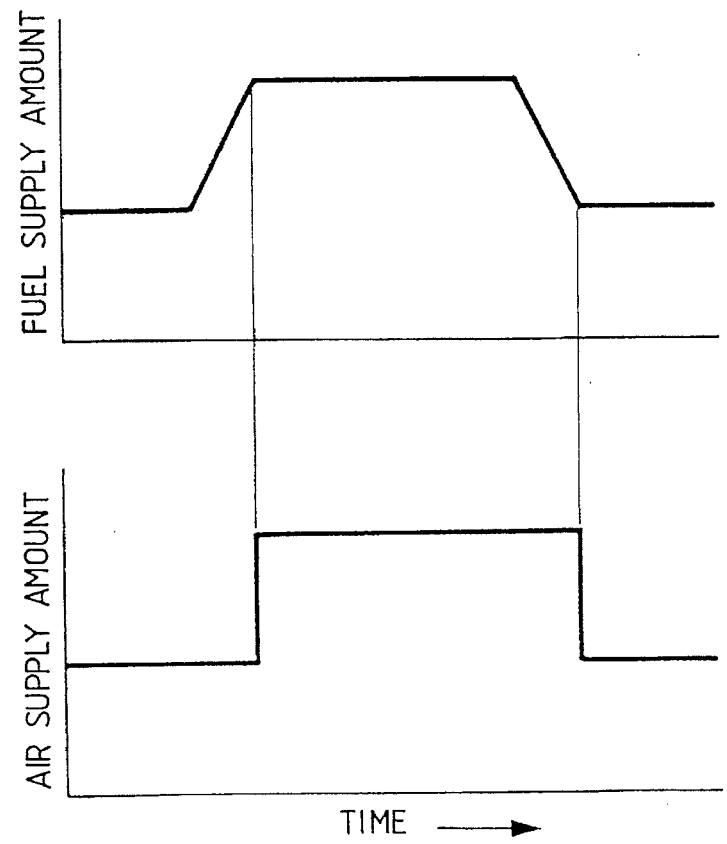
FIG. 20A
FIG. 20B

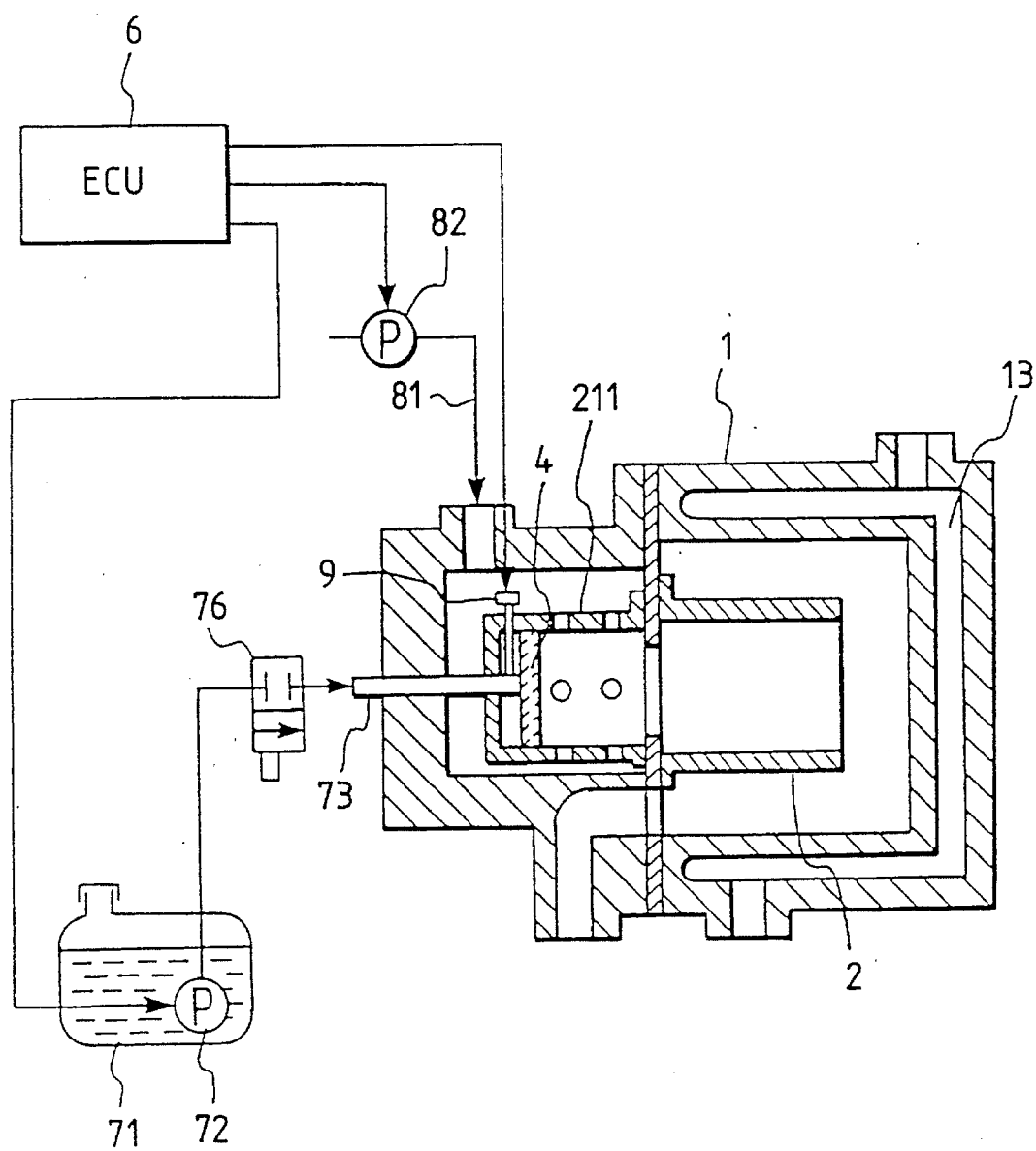

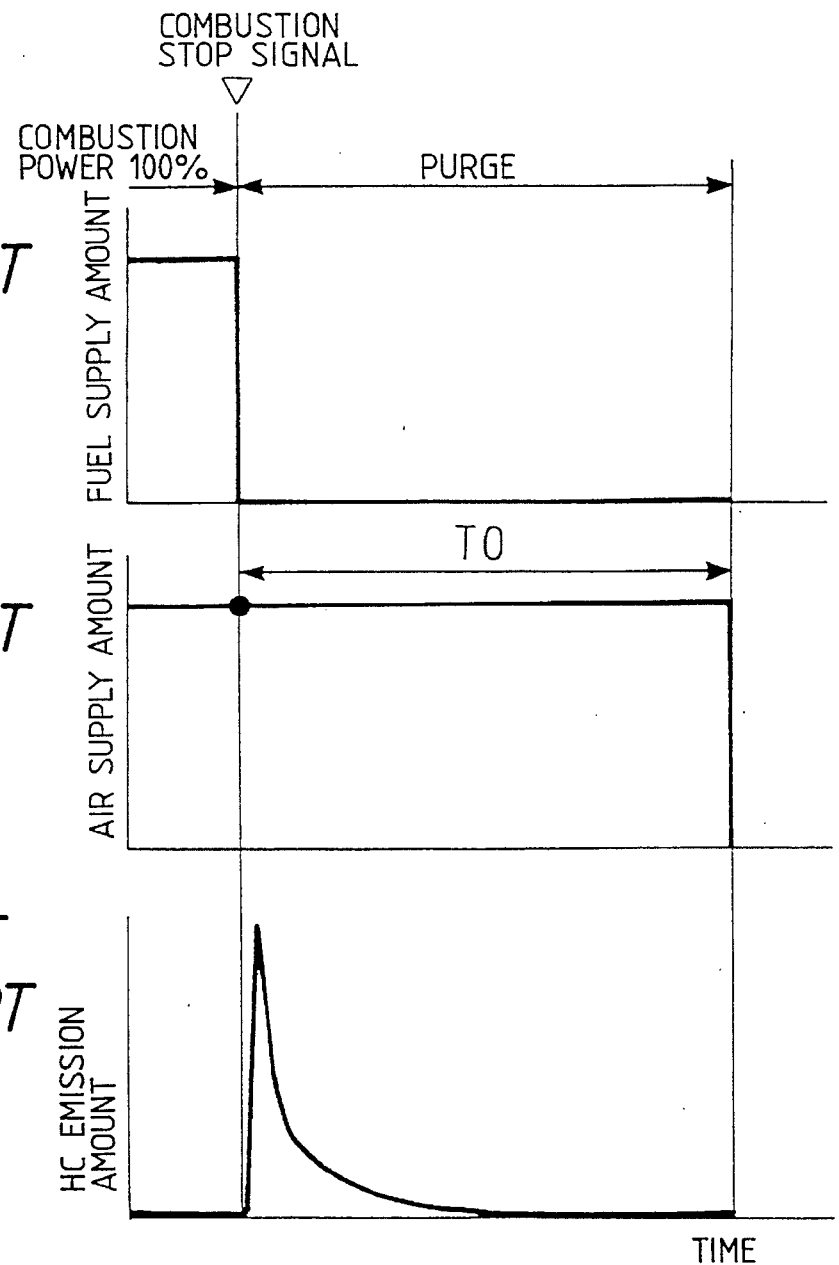

5,617,995

COMBUSTION HEATER

BACKGROUND OF THE INVENTION

1. Field of the Invention

The present invention relates to a combustion heater, and more specifically, to the combustion heater which prevents incomplete combustion for improving emissions in the exhaust gas.

2. Description of the Prior Art

As is known in the art, the combustion heater is arranged to burn up a portion of an engine fuel with a burner for directly heating air in a vehicular compartment or heating water to be conducted to a radiator in the vehicular compartment. The combustion heater is used as an auxiliary vehicle heater before a temperature of the engine cooling water increases to a given high value.

In the burner of the combustion heater, the supplied fuel is vaporized and mixed with combustion air, and this mixture is ignited and burned using a heater or a glow plug.

FIG. 23 shows one example of the conventional combustion heaters. In the figure, a housing 1 has a double-wall structure to define a fluid passage 13 for water to be conducted to a radiator (not shown). A burner 2 is arranged in the housing 1. The burner 2 has a burner tube which is provided with a vaporization plate 4 at one axial end thereof. The vaporization plate 4 is prepared by forming ceramic fibers into a plate shape. An open end of a fuel feed pipe 73 is in abutment with the vaporization plate 4. Fuel is fed to the fuel feed pipe 73 from a pump 72 in a fuel tank 71 via a fuel cutoff valve 76. The fuel then reaches the vaporization plate 4 where the fuel is dispersed over the entirety of the vaporization plate 4 due to the capillary action. The vaporization plate 4 is heated by a glow plug 9 provided adjacent thereto. Accordingly, the fuel is vaporized from the vaporization plate 4 and then mixed with combustion air introduced into the burner tube via air introducing holes 211 so as to be ignited to burn. The combustion air is supplied from an air pump 82 provided at an air feed pipe 81 extending to an air inlet of the housing 1.

An electronic control unit (ECU) 6 is provided for controlling an operation of the pump 72, an opening/closing operation of the fuel cutoff valve 76, and energization of the glow plug 9. The ECU 6 further controls an operation of the air pump 82.

The combustion heater using such a vaporization plate is disclosed in, such as, Japanese First (unexamined) Patent Publication No. 1-262214, Japanese First (unexamined) Utility Model Publication No. 3-71251, Japanese First (unexamined) Patent Publication No. 4-73503, Japanese First (unexamined) Patent Publication No. 4-214105 equivalent to U.S. Pat. No. 5,088,918, or U.S. Pat. No. 4,538,985.

For further prior art information, Japanese First (unexamined) Patent Publication No. 60-29505 shows a catalytic heater in which fuel is atomized using an ultrasonic vibrator.

In the conventional combustion heaters, however, a portion of the supplied fuel does not reach a combustion temperature at the time of ignition since the burner is cold at that time. This increases HC emissions in the form of unburned gas. Similarly, a problem is also raised at the time of extinction that, since the fuel supply is suddenly stopped, the fuel remaining in the vaporization plate becomes unburned gas to increase HC emissions.

In Japanese First (unexamined) Utility Model Publication No. 3-71251 as referred to above, the fuel supply is suddenly stopped at the time of extinction, while an air supply mount at the time of the fuel supply stop is held for a given short time period thereafter. FIGS. 24A and 24B show, respectively, variations in fuel supply amount and air supply amount at the time of extinction of the combustion heater. As seen from these figures, in response to a combustion stop signal, the ECU 6 immediately stops the fuel supply, while maintaining the air supply amount corresponding to the combustion power of 100% for a given time period T0 for purging the exhaust gas including HC and for cooling the burner.

As described above, in the combustion heater using the vaporization plate 4, the fuel supplied to the vaporization plate 4 is first dispersed over the entirety thereof due to the capillary action and then, after being held at the vaporization plate 4 for a while, vaporized from the vaporization plate 4. Accordingly, when the fuel supply is stopped, the fuel still remains largely at the vaporization plate 4. Thus, if a large amount of the air supply is held in this condition to cause deviation of an air-fuel ratio of the supplied air and the vaporizing remaining fuel from a proper air-fuel ratio, HC emissions are increased as shown in FIG. 24C.

Further, in the foregoing combustion heaters, as described above, it takes some time for the fuel supplied to the vaporization plate 4 to be vaporized from the vaporization plate 4. On the other hand, the combustion air is directly introduced into the burner tube via the air introducing holes 211. Accordingly, when the fuel and the air are supplied synchronously, the air is oversupplied at the initial stage of the combustion to deteriorate the exhaust gas emissions. This applies not only to the initial stage of the combustion but also when increasing the fuel supply amount for enhancing the heating power. Further, it also takes some time for the vaporizing fuel to be decreased after stopping or reducing the fuel supply at the time of extinction or at the time of lowering the heating power. This causes the fuel to be oversupplied to thus deteriorate the exhaust gas emissions.

SUMMARY OF THE INVENTION

In view of the foregoing, it is an object of the present invention to provide an improved combustion heater which solves the aforementioned drawbacks of the conventional combustion heaters.

According to one aspect of the present invention, a combustion heater having a burner in a housing provided with a fluid passage for heating a fluid introduced in the fluid passage comprises fuel feed means for supplying a fuel to the burner; air feed means for supplying combustion air to the burner depending on a fuel supply amount from the fuel feed means; ignition means for igniting the supplied fuel in the burner; and fuel supply amount setting means for increasing stepwise the fuel supply amount from the fuel feed means during a time period from ignition of the supplied fuel by the ignition means to generation of a given heat quantity by the burner.

According to another aspect of the present invention, a combustion heater having a burner in a housing provided with a fluid passage for heating a fluid introduced in the fluid passage comprises fuel feed means for supplying a fuel to the burner; air feed means for supplying combustion air to the burner depending on a fuel supply amount from the fuel feed means; ignition means for igniting the supplied fuel in the burner; and fuel supply amount setting means for decreasing stepwise the fuel supply amount from the fuel feed means at the time of extinction in the burner.

According to another aspect of the present invention, a combustion heater having a burner in a housing provided with a fluid passage for heating a fluid introduced in the fluid passage comprises a vaporization member for vaporizing a fuel; fuel feed means for supplying the fuel to the vaporization member; air feed means for supplying combustion air to the burner; and combustion control means for controlling combustion in the burner, the combustion control means, at the time of extinction in the burner, reducing a fuel supply amount from the fuel feed means and an air supply amount from the air feed means to given values, respectively, and holding the fuel supply amount and the air supply amount at the given values for a given time period, the combustion control means, after lapse of the given time period, stopping the fuel supply from the fuel feed means while holding the air supply mount at the given value for a further given time period.

According to another aspect of the present invention, a combustion heater having a burner in a housing provided with a fluid passage for heating a fluid introduced in the fluid passage comprises fuel feed means for supplying a fuel; a vaporization member for vaporizing the fuel from the fuel feed means for a supply into a burner tube of the burner; air feed means for supplying combustion air into the burner tube; and air supply amount control means for changing an air supply amount from the air feed means with a given time delay relative to a change of a fuel supply amount from the fuel feed means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 10A, 10B and 10C are diagrams, respectively, showing time-domain variations of a fuel supply mount, an air supply amount and a hydrocarbon (HC) emission amount at the time of extinction of flame according to the sixth embodiment;

FIGS. 11A, 11B, 11C and 11D are diagrams, respectively, showing time-domain variations of a fuel supply amount, an air supply amount, a voltage applied to a glow plug and a hydrocarbon (HC) emission amount at the time of extinction of flame according to a seventh embodiment of the present invention;

FIGS. 12A, 12B and 12C are diagrams, respectively, showing time-domain variations of a fuel supply amount, an air supply mount and a hydrocarbon (HC) emission amount at the time of extinction of flame according to an eighth embodiment of the present invention;

FIGS. 13A, 13B, 13C and 13D are diagrams, respectively, showing time-domain variations of a fuel supply amount, an air supply amount, a voltage applied to a glow plug and a hydrocarbon (HC) emission amount at the time of extinction of flame according to a ninth embodiment of the present invention;

FIGS. 14A, 14B and 14C are diagrams, respectively, showing time-domain variations of a voltage applied to a glow plug, a fuel supply amount and an air supply amount at the time of ignition according to a tenth embodiment of the present invention;

FIGS. 15A, 15B and 15C are diagrams, respectively, showing time-domain variations of a fuel supply amount, an air supply amount and a hydrocarbon (HC) emission amount during a steady combustion according to the tenth embodiment;

FIG. 16 is a flowchart showing a control routine for controlling a fuel supply amount and an air supply amount during an initial stage of combustion and a steady combustion;

FIGS. 19A and 19B are diagrams, respectively, showing time-domain variations of a fuel supply amount and an air supply mount during a steady combustion according to a thirteenth embodiment of the present invention;

FIGS. 20A and 20B are diagrams, respectively, showing time-domain variations of a fuel supply mount and an air supply amount during a steady combustion according to a fourteenth embodiment of the present invention;

FIG. 23 is a sectional view showing the overall structure of a conventional combustion heater; and FIGS. 24A, 24B and 24C are diagrams, respectively, showing time-domain variations of a fuel supply amount, an air supply amount and a hydrocarbon (HC) emission amount at the time of extinction of flame according to the prior art.

DESCRIPTION OF THE PREFERRED EMBODIMENT

Now, preferred embodiments of the present invention will be described hereinbelow with reference to the accompanying drawings.

Figure 1:
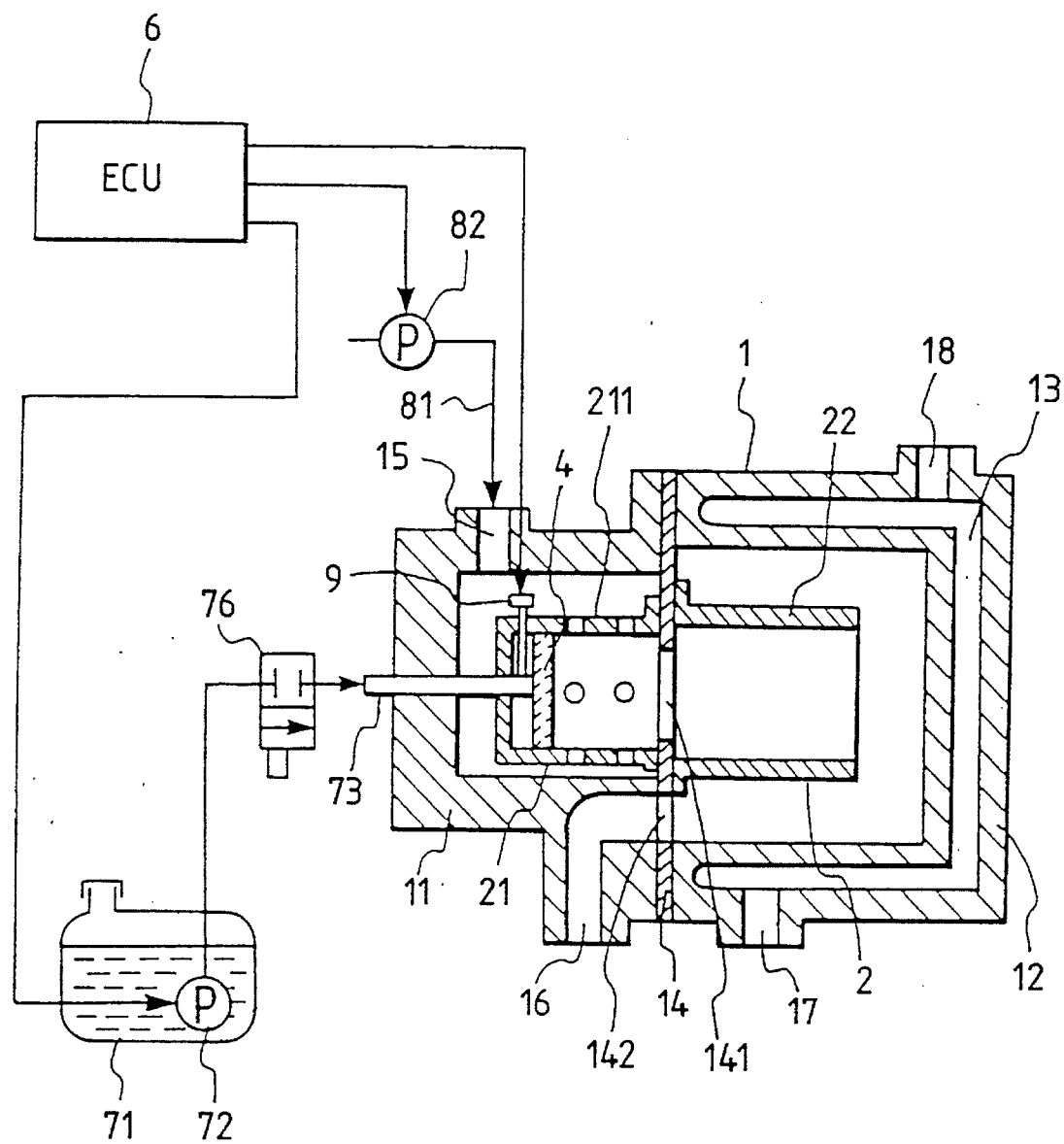
FIG. 1 is a sectional view showing the overall structure of a combustion heater to be used in a first embodiment of the present invention.

FIG. 1 is a sectional view showing a combustion heater used in a first embodiment of the present invention. In FIG. 1, the same or like elements are designated by the same reference numerals as those in FIG. 23.

In FIG. 1, a housing 1 of the combustion heater includes a pair of housing halves 11 and 12 which are fixed to each other at their open ends with a partition plate 14 interposed therebetween. The housing half 11 has an upper wall portion formed with an air inlet 15 and a lower wall portion formed with an exhaust-gas outlet 16. The housing half 12 has a double-wall structure to form a fluid passage 13. The fluid passage 13 communicates with a water inlet 17 formed at a lower wall portion of the housing half 12 and with a water outlet 18 formed at an upper wall portion of the housing half 12 for conducting water, as a heat transfer medium, to a radiator (not shown) provided in a vehicular compartment.

In the housing 1, a burner 2 is fixedly disposed at the center thereof. The burner 2 has a burner tube which is composed of a mixture tube 21 and a combustion tube 22 projecting from opposite sides of the partition plate 14, respectively. The combustion tube 22 is a cylindrical body having a relatively large diameter as compared with the mixture tube 21 which is also a cylindrical body. The combustion tube 22 is located in an interior space of the housing half 12 which communicates with the exhaust-gas outlet 16 via a through hole 142 formed at the partition plate 14. The mixture tube 21 is located in an interior space of the housing half 11 which communicates with the air inlet 15. The mixture tube 21 is closed at its axial end remote from the partition plate 14. A vaporization plate 4 is disposed in the mixture tube 21 near the closed axial end thereof. The vaporization plate 4 is in the form of a porous disk body and arranged to cross laterally the inside of the mixture tube 21. The interior of the mixture tube 21 communicates with the interior of the combustion tube 22 via an opening 141 formed at the center of the partition plate 14.

A fuel feed pipe 73 is arranged to penetrate an axial end wall of the housing half 11 remote from the partition plate 14 and further penetrate the foregoing closed axial end of the mixture tube 21 so that an open tip of the fuel feed pipe 73 is in abutment with the vaporization plate 4. Fuel is fed to the fuel feed pipe 73 from a pump 72 in a fuel tank 71 via a fuel cutoff valve 76. The fuel then reaches the vaporization plate 4 where the fuel is dispersed over the entirety of the vaporization plate 4 due to the capillary action. The vaporization plate 4 is heated by a glow plug 9 provided adjacent thereto. Thus, the fuel is vaporized from the vaporization plate 4 and then mixed with combustion air introduced into the mixture tube 21 via air introducing holes 211 formed at the circumferential wall of the mixture tube 21, so as to be ignited to burn. Flame is ejected through an opening of the combustion tube 22 remote from the partition plate 14. The water flowing in the fluid passage 13 is heated by the flame and fed to the radiator so as to perform heating in the vehicular compartment. Burned gas as a result of the combustion is discharged through the exhaust-gas outlet 16.

The combustion air introduced into the mixture tube 21 via the air introducing holes 211 is supplied from an air pump 82 provided at an air feed pipe 81 extending to reach the air inlet 15 of the housing half 11.

An electronic control unit (ECU) 6 controls an operation of the pump 72, an opening/closing operation of the fuel cutoff valve 76, and energization of the glow plug 9. The ECU 6 further controls an operation of the air pump 82.

Figure 2:
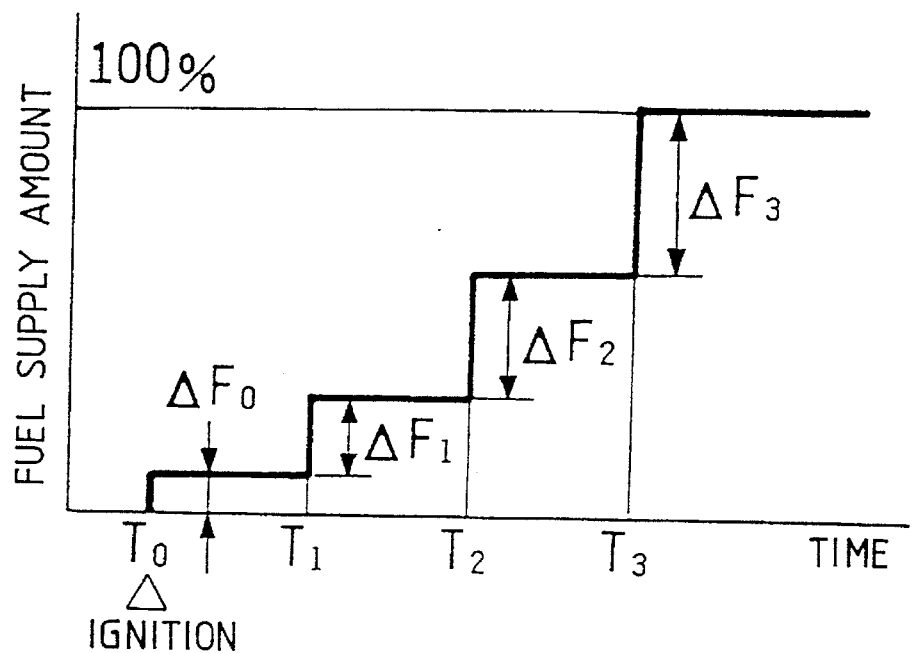
FIG. 2 is a diagram showing a time-domain variation of a fuel supply amount at the time of ignition according to the first embodiment.

FIG. 2 shows a fuel supply amount control performed by the ECU 6 at the time of ignition according to the first preferred embodiment. As shown in the figure, a fuel supply amount is increased stepwise per constant period from the ignition to reach a fuel supply amount of 100% which achieves the required heating power. Further, increasing amounts $\Delta F_0$, $\Delta F_1$, $\Delta F_2$ and $\Delta F_3$ of the fuel supply amount are increased in turn corresponding to generated calories or generated heat quantities of the burner 2 (that is, supplied fuel amounts, for example) at corresponding fuel increasing time points $T_0$, $T_1$, $T_2$ and $T_3$. In other words, the increasing amount of the fuel supply mount is increased as the generated heat quantity is increased.

Further, in this embodiment, the ECU 6 controls the air pump 82 to supply a given small amount of the combustion air into the burner 2 via the air introducing holes 211 prior to the ignition. The ECU 6 further controls the air pump 82 to increase the air supply amount stepwise at the time points $T_1$, $T_2$ and $T_3$ corresponding to the increment of the fuel supply amount. The ECU 6 may increase the air supply amount linearly instead of stepwise.

According to the fuel supply amount control as described above, a fuel increasing amount is small at the initial stage of the combustion when the burner 2 is cold, so as to achieve a small fuel supply amount as a whole. Accordingly, all the supplied fuel is heated by the glow plug 9 to fully reach a vaporization temperature so that all the supplied fuel is vaporized and burned completely. Thus, HC emissions due to the presence of the unburned gas are prevented. Further, since the air is introduced into the burner 2 prior to the ignition, the incomplete combustion is prevented even at the very beginning of the combustion.

Thereafter, the fuel increasing amount is increased as the temperature of the burner 2 is increased, that is, as the supplied fuel amount is increased. As a result, the supplied fuel amount is rapidly increased to enhance the generated heat quantity of the burner 2 so that the quick heating is achieved.

Figure 3:
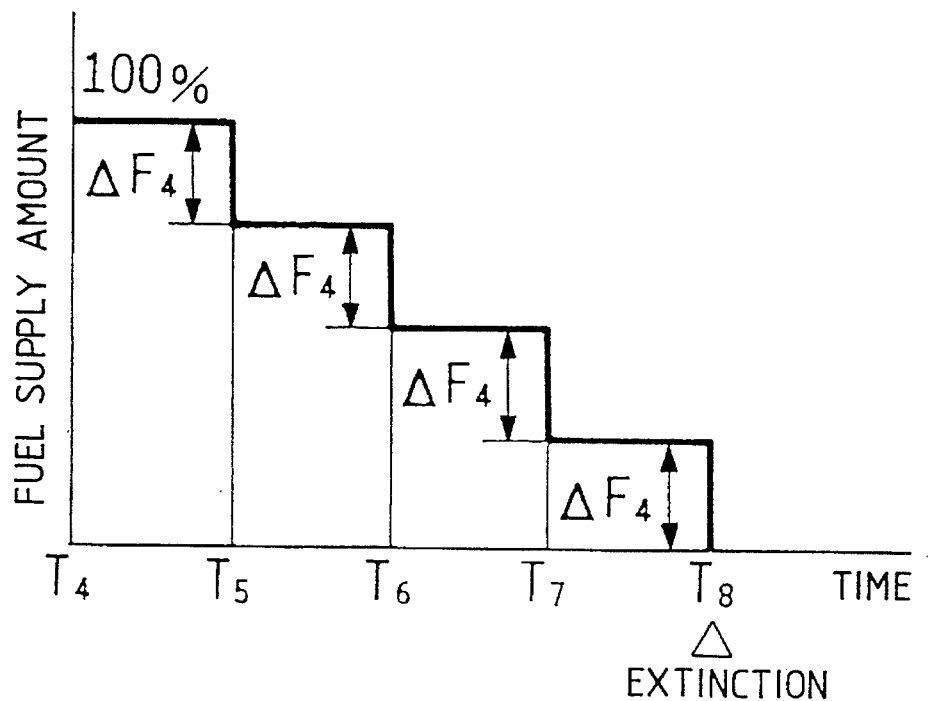
FIG. 3 is a diagram showing a time-domain variation of a fuel supply amount at the time of extinction of flame according to the first embodiment.

FIG. 3 shows a fuel supply amount control performed by the ECU 6 at the time of extinction according to the first embodiment. As shown in the figure, a fuel supply amount is decreased stepwise per constant period and per constant decreasing amount $\Delta F_4$ at time points $T_5$, $T_6$, $T_7$ and $T_8$ from the supply amount of 100% to that of 0%, that is, the extinction of flame.

The ECU 6 further controls the air pump 82 to decrease the air supply amount stepwise at the time points $T_5$, $T_6$, $T_7$ and $T_8$ corresponding to the decrement of the fuel supply amount. The ECU 6 may decrease the air supply amount linearly to zero instead of stepwise.

With the foregoing control at the time of extinction, the unburned gas is prevented from remaining at the vaporization plate 4 at the time of extinction so that HC emissions are avoided.

Now, a second embodiment of the present invention will be described hereinbelow.

Figure 4:
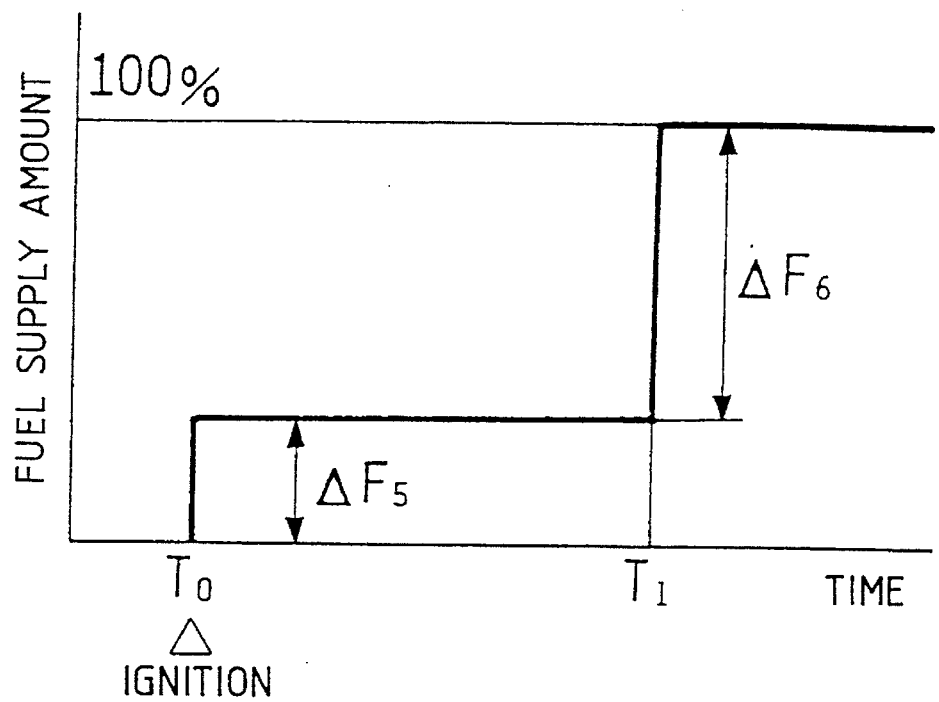
FIG. 4 is a diagram showing a time-domain variation of a fuel supply amount at the time of ignition according to a second embodiment of the present invention.

In the foregoing first embodiment, the fuel supply amount increment at the time of ignition, i.e. the initial stage of the combustion, is performed through four steps. On the other hand, in the second preferred embodiment, as shown in FIG. 4, a fuel supply amount increment is performed through two steps with fuel increasing amounts $\Delta F_5$ and $\Delta F_6$. As seen in the figure, the fuel increasing amount $\Delta F_5$ at the first step ($T_0$) is smaller than the fuel increasing amount $\Delta F_6$ at the second step (T1). Naturally, the generated heat quantity of the burner 2 at the first step is smaller than that at the second step.

As appreciated, the fuel supply amount decreasing control at the time of extinction may be performed as in the first embodiment.

The other structure is the same as that in the first embodiment.

Now, a third embodiment of the present invention will be described hereinbelow.

Figure 5:
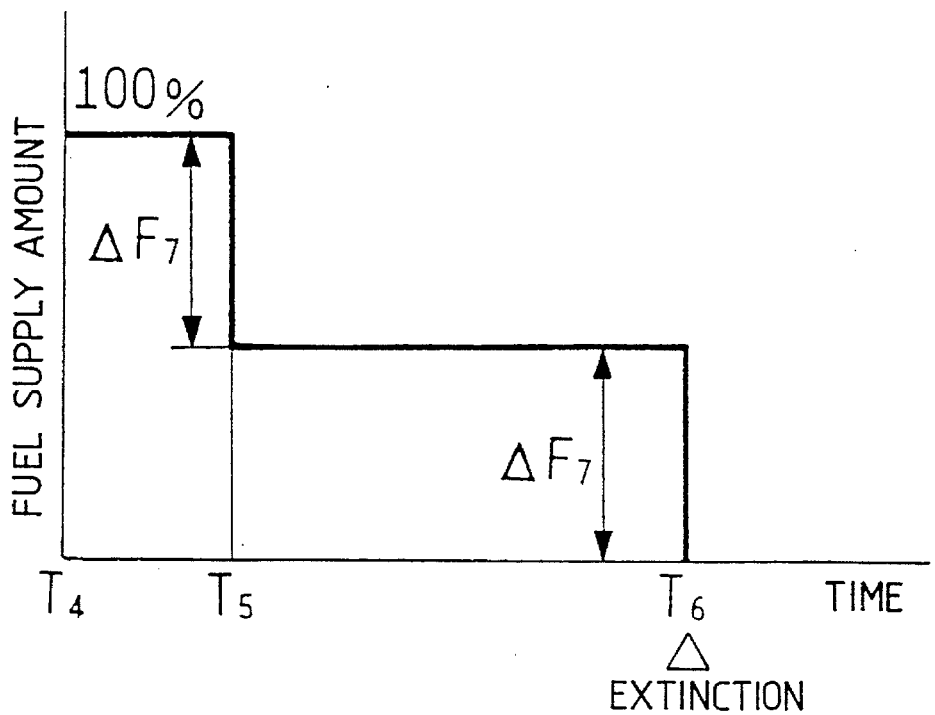
FIG. 5 is a diagram showing a time-domain variation of a fuel supply amount at the time of extinction of flame according to a third embodiment of the present invention.

In the foregoing first embodiment, the fuel supply amount decrement at the time of extinction is performed through four steps. On the other hand, in the third embodiment, as shown in FIG. 5, a fuel supply amount decrement is performed through two steps with a fuel decreasing amount $\Delta F_7$. Different fuel decreasing amounts may be set at the first and second steps (T5 and T6).

As appreciated, the fuel supply amount increasing control at the time of ignition may be performed as in the first or second embodiment.

The other structure is the same as that in the first embodiment.

Now, a fourth embodiment of the present invention will be described hereinbelow.

Figure 6:
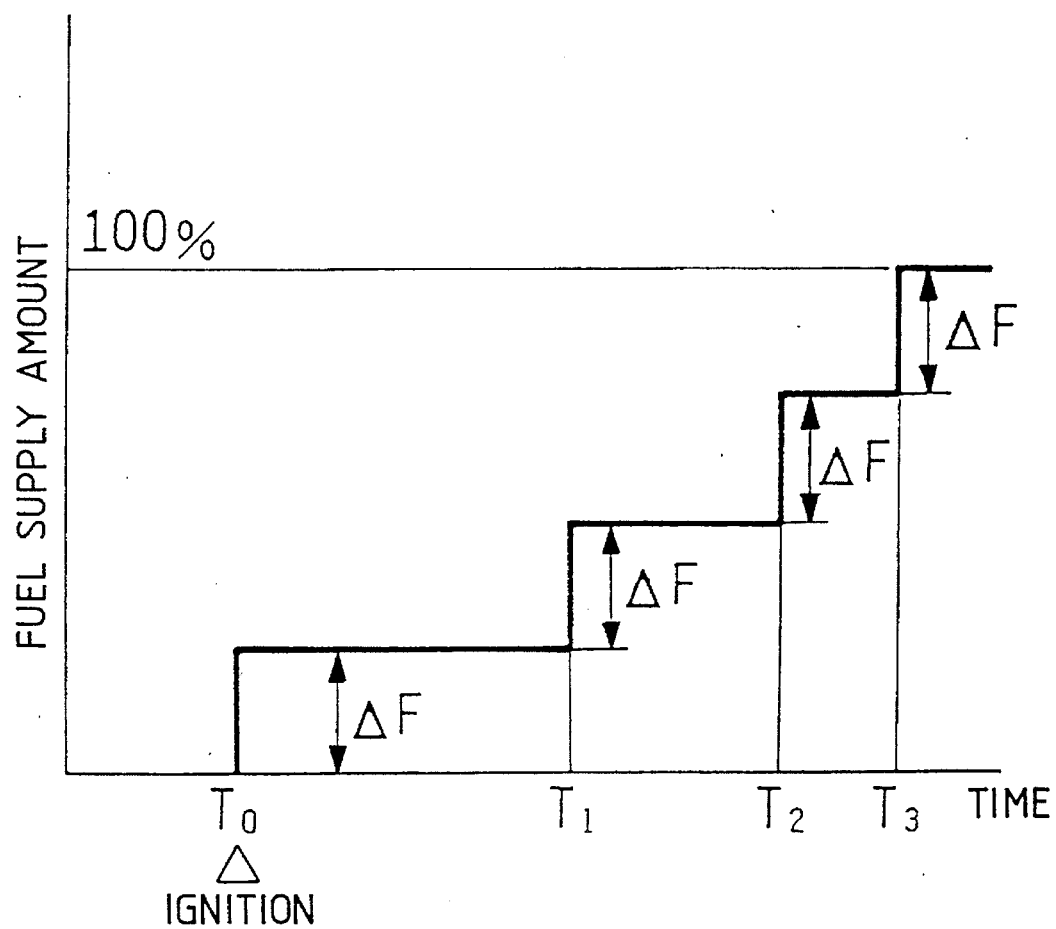
FIG. 6 is a diagram showing a time-domain variation of a fuel supply amount at the time of ignition according to a fourth embodiment of the present invention.

In the foregoing first embodiment, the fuel supply amount increment is performed stepwise with the different fuel increasing amounts and with the constant fuel increasing period. On the other hand, in the fourth embodiment, as shown in FIG. 6, a fuel supply amount increment is performed stepwise with a constant fuel increasing amount $\Delta F$ and with different fuel increasing periods. Specifically, as seen in the figure, the fuel increasing periods (T1–T0), (T2–T1) and (T3–T2) are shortened in turn depending on the generated heat quantifies of the burner 2. In other words, the fuel increasing period is shortened as the generated heat quantity is increased.

In the fourth embodiment as described above, since a fuel supply amount is small at the initial stage of the combustion when the burner 2 is cold, all the supplied fuel is heated by the glow plug 9 to fully reach the vaporization temperature so that all the supplied fuel is vaporized and burned completely. Thus, HC emissions due to the presence of the unburned gas are prevented.

Thereafter, as the temperature of the burner 2 is increased, that is, as the supplied fuel amount is increased, the fuel supply amount is rapidly increased so that the quick heating is achieved.

As appreciated, the fuel supply amount decreasing control at the time of extinction may be performed as in the first or third embodiment.

The other structure is the same as that in the first embodiment.

Now, a fifth embodiment of the present invention will be described hereinbelow.

Figure 7:
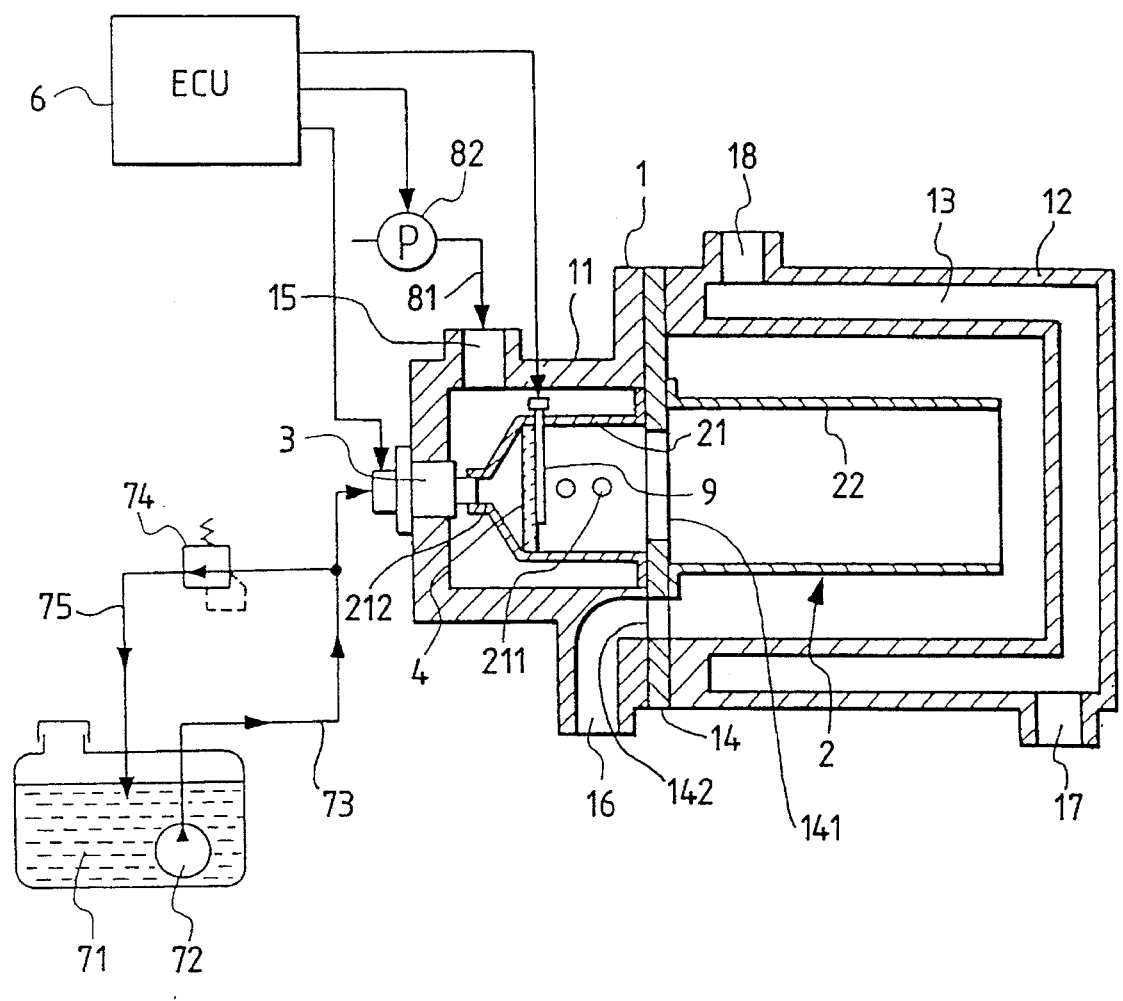
FIG. 7 is a sectional view showing the overall structure of a combustion heater to be used in a fifth embodiment of the present invention.

FIG. 7 is a sectional view showing a combustion heater to be used in the fifth embodiment, wherein the same or like elements are designated by the same reference numerals as those in FIG. 1 so as to omit explanation thereof as much as possible to avoid redundant disclosure.

As shown in FIG. 7, in the combustion heater of the fifth embodiment, an electromagnetic fuel injection valve 3 is arranged to penetrate an axial end wall of a housing half 11 remote from a partition plate 14. Further, a tip of the fuel injection valve 3 is mounted in a small hole 212 of a mixture tube 21 and exposed to the interior of the mixture tube 21. In the mixture tube 21, a vaporization plate 4 is disposed so as to cross laterally the inside of the mixture tube 21 and confront the tip of the fuel injection valve 3. The vaporization plate 4 is heated by a glow plug 9 as in the foregoing preferred embodiment.

The fuel injection valve 3 is connected to a tip of a fuel feed pipe 73 extending from a pump 72 provided in a fuel tank 71 so as to be supplied with the fuel therefrom. A return pipe 75 provided with a relief valve or a pressure regulator 74 is connected to the fuel feed pipe 73 for returning an excess portion of the fuel to the fuel tank 71.

The fuel injection valve 3 is open-close controlled by a pulse voltage signal from the ECU 6. A fuel injection amount (fuel supply amount) of the fuel injection valve 3 is controlled by changing a pulse frequency or a pulse width.

Figure 8A:
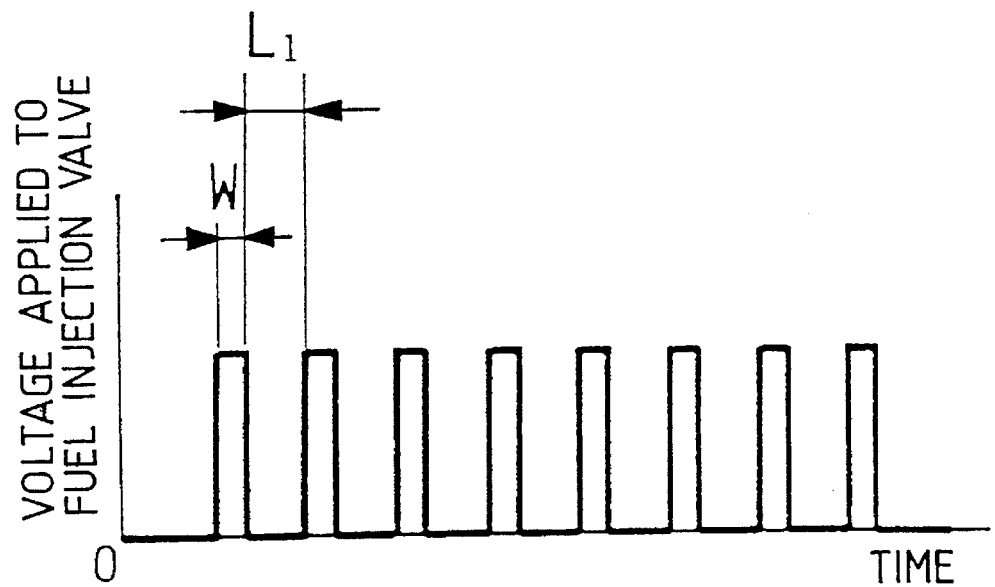
FIGS. 8A and 8B are diagrams, respectively, for explaining how to control a voltage applied to a fuel injection valve using a pulse signal.
Figure 8B:
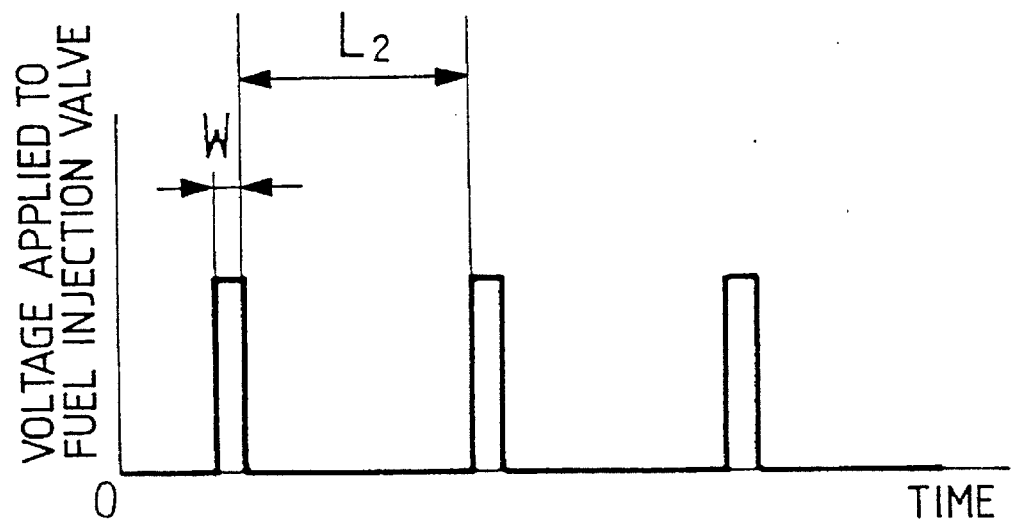

For example, as shown in FIGS. 8A and 8B, when a pulse width W of the voltage signal is constant, the fuel supply amount is increased by shortening a pulse interval L1 (FIG. 8A), while the fuel supply amount is decreased by prolonging a pulse interval L2 (FIG. 8B).

In the fifth embodiment, the fuel injection valve 3 is used for performing the fuel supply control of the foregoing first, second, third or fourth embodiment. This ensures the stable fuel supply control which is free of fluctuation of the supply voltage.

Now, a sixth embodiment of the present invention will be described hereinbelow.

Figure 9:
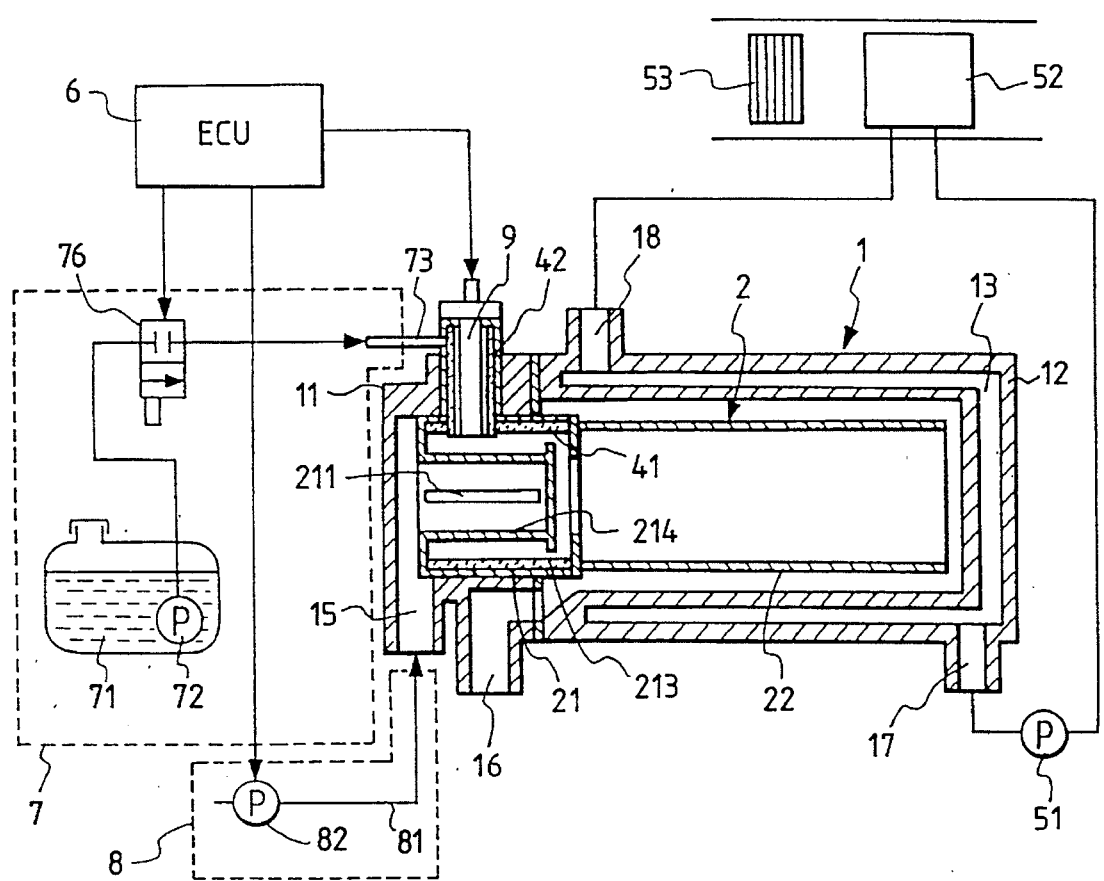
FIG. 9 is a sectional view showing the overall structure of a combustion heater to be used in a sixth embodiment of the present invention.

FIG. 9 is a sectional view showing a combustion heater to be used in the sixth embodiment, wherein the same or like elements are designated by the same reference numerals as those in FIG. 1 so as to omit explanation thereof as much as possible to avoid redundant disclosure.

In FIG. 9, water discharged from a water pump 51 is introduced into a fluid passage 13 via a water inlet 17 so as to be heated, and then supplied via a water outlet 18 to a heat exchanger 52, such as, a radiator in the vehicular compartment in a circulating manner. A blower 53 is provided facing the heat exchanger 52 to feed air for heating to the heat exchanger 52. A burner 2 has a burner tube which is composed of a mixture tube 21 and a combustion tube 22 extending from the mixture tube 21. The mixture tube 21 is of a double-tube structure having an outer tube 213 and an inner tube 214. A tubular vaporization member 41 made of ceramic fibers is provided on an inner circumferential surface of the outer tube 213. A glow plug 9 is arranged to penetrate an upper wall portion of a housing half 11 and further penetrate a circumferential wall of the outer tube 213 so that a tip of the glow plug 9 is exposed to the inside of the outer tube 213. A tubular vaporization member 42 made of ceramic fibers is further provided around the glow plug 9 and connected to the vaporization member 41. Further, a tip of a fuel feed pipe 73 forming fuel supply means 7 is in abutment with an outer periphery of the vaporization member 42. The fuel feed pipe 73 extends to reach a fuel pump 72 in a fuel tank 71 via a fuel cutoff valve 76.

An air inlet 15 is provided at a lower side of the housing half 11. The combustion air is supplied to the air inlet 15 from an air pump 82 forming air supply means 8. The air inlet 15 communicates with the inside of the inner tube 214. The combustion air is supplied to the inside of the outer tube 213 via air introducing holes 211 formed at a circumferential wall of the inner tube 214 and then mixed with the fuel vaporized from the vaporization members 41 and 42 to be ignited by the glow plug 9. The ignited mixture forms flame in the combustion tube 22 to heat the water flowing in the fluid passage 13 and is then discharged, as exhaust gas, through an exhaust-gas outlet 16. The vaporization of the fuel is facilitated by heat from the glow plug 9 before the ignition and by radiation heat from the flame during the steady combustion.

FIGS. 10A and 10B show, respectively, a fuel supply amount control and an air supply amount control performed by the ECU 6 at the time of extinction according to the sixth preferred embodiment. In response to a combustion stop signal, the ECU 6, which has supplied the fuel and the air at maximum corresponding to the combustion power of 100%, reduces a fuel supply amount to Qf and further reduces an air supply amount simultaneously to Qa for holding a proper air-fuel ratio. The reduced fuel supply amount at Qf and the reduced fuel supply amount at Qa are both maintained for a time period $T_1$ (10 seconds in this preferred embodiment). Accordingly, the fuel supply amount to the vaporization members 41 and 42 is reduced so as to diminish the fuel remaining at the vaporization members 41 and 42 after the subsequent fuel supply stop without largely fluctuating the air-fuel ratio. In this preferred embodiment, the reduced fuel supply amount Qf and the reduced air supply amount Qa are selected so as to provide the combustion power of about 30%. This means that the fuel supply amount and the air supply mount are reduced as much as possible within a range which does not cause unstable combustion.

Upon lapse of $T_1$, the fuel supply is stopped as shown in FIG. 10A. On the other hand, the air supply amount Qa is held for a further time period $T_2$ (60 seconds in this preferred embodiment). The fuel remaining at the vaporization members 41 and 42 continues to be vaporized even after the fuel supply is stopped. However, this vaporization amount is relatively small due to the reduction of the fuel supply amount to Qf in advance of the fuel supply stop. Accordingly, with the reduced air supply mount Qa, the burning of the remaining fuel is continued without causing large fluctuation of the air-fuel ratio. Thus, an amount of HC to be produced due to deviation of the air-fuel ratio after the fuel supply stop is suppressed to be small as shown by solid line in FIG. 10C. As appreciated, broken line in FIG. 10C represents an HC emission amount caused in the prior art as shown in FIG. 24C. Although the flame produced by the remaining fuel is small, since the air supply amount is also small, the flame is not blown out by the supplied air.

After lapse of $T_2$, that is, after all the remaining fuel is burned up, the air supply amount is again increased to the maximum value which is held for a time period $T_0$ (120 seconds in this preferred embodiment). This maximum air supply effectively cools the combustion heater and further purges the exhaust gas.

As appreciated, the fuel supply amount increasing control at the time of ignition may be performed as in the first, second or fourth embodiment.

Now, a seventh preferred embodiment of the present invention will be described hereinbelow.

The seventh embodiment differs from the foregoing sixth embodiment in that the glow plug 9 is energized during the time periods $T_1$ and $T_2$ as shown in FIGS. 11A, 11B and 11C. With this arrangement, even when the flame is small to cause the radiation heat therefrom to be insufficient, the heat from the glow plug 9 quickly and reliably vaporizes the fuel from the vaporization members 41 and 42 so as to be ignited to burn. This further reduces HC emissions in the exhaust gas as shown in FIG. 11D.

The other structure is the same as that in the foregoing sixth embodiment.

As appreciated, the fuel supply amount increasing control at the time of ignition may be performed as in the first, second or fourth embodiment.

Now, an eighth embodiment of the present invention will be described hereinbelow.

In the eighth embodiment, as shown in FIGS. 12A and 12B, the time period $T_2$ in the foregoing sixth embodiment is divided into time periods $T_3$ and $T_4$. Further, during $T_4$, the air supply amount is decreased gradually to 0 (zero) at a constant rate. Since the fuel remaining at the vaporization members 41 and 42 is reduced with lapse of time, the vaporization amount starts to be decreased during $T_2$. Accordingly, by dividing $T_2$ into $T_3$ and $T_4$ and gradually decreasing the air supply amount during $T_4$, that is, gradually decreasing the air supply amount corresponding to the reduction of the vaporized fuel amount, the fluctuation of the air-fuel ratio is suppressed to be smaller so as to further diminish HC emissions as shown in FIG. 12C.

The other structure is the same as that in the foregoing sixth embodiment.

As appreciated, the fuel supply amount increasing control at the time of ignition may be performed as in the first, second or fourth embodiment.

Now, a ninth embodiment of the present invention will be described hereinbelow.

The ninth embodiment differs from the foregoing eighth preferred embodiment in that the glow plug 9 is energized during the time periods $T_1$, $T_3$ and $T_4$ as shown in FIGS. 13A, 13B and 13C. With this arrangement, the heat from the glow plug 9 quickly and reliably vaporizes the fuel from the vaporization members 41 and 42 so as to be ignited to burn. This further reduces HC emissions in the exhaust gas as shown in FIG. 13D.

The other structure is the same as that in the foregoing eighth embodiment.

As appreciated, the fuel supply amount increasing control at the time of ignition may be performed as in the first, second or fourth embodiment.

Now, a tenth embodiment of the present invention will be described hereinbelow.

In the tenth embodiment, the combustion heater as shown in FIG. 7 is used.

An operation according to the tenth embodiment will be described hereinbelow.

At the time of ignition, as shown in FIGS. 14A and 14B, the glow plug 9 is energized to be heated, and thereafter, the fuel is supplied from the fuel injection valve 3 to the vaporization plate 4 provided adjacent to the glow plug 9. A supply amount of the fuel is controlled based on a pulse frequency applied to the fuel injection valve 3. As shown in FIG. 14C, prior to the fuel supply and the energization of the glow plug 9, a given small amount of the combustion air is supplied into the mixture tube 21 via the air introducing holes 211 from the air pump 82. An air supply amount is controlled based on a d.c. voltage applied to the air pump 82. As seen from FIGS. 14A and 14B, the glow plug 9 is deenergized after the ignition.

Specifically, in this embodiment, as shown in FIG. 14B, the fuel supply amount, i.e. the combustion power of the heater is increased stepwise from the ignition to the steady combustion with a constant fuel increasing amount and with a constant fuel increasing period. On the other hand, as shown in FIG. 14C, a timing of increasing the air supply amount is delayed relative to a timing of the fuel supply amount increment by a delay time $t_0$ (3 seconds in this preferred embodiment).

On the other hand, during the steady combustion, as shown in FIGS. 15A and 15B, when increasing the combustion power, the air supply amount increment is delayed relative to the fuel supply amount increment by a delay time t1 (3 seconds in this preferred embodiment). Similarly, when decreasing the combustion power, the air supply amount decrement is delayed relative to the fuel supply amount decrement by a delay time t2 (3 seconds in this preferred embodiment). Since the radiation heat quantity applied to the vaporization plate 4 from the flame is large enough to vaporize an amount of the fuel required for the steady combustion of 100%, a time required for the fuel to be vaporized may be considered to be essentially the same whether the combustion power is 50% or 100% so that t1 and t2 are set to the same value in this preferred embodiment.

By performing such a timing control, a variation of the vaporized fuel amount supplied from the vaporization plate 4 and a variation of the air supply amount substantially coincide with each other. As a result, HC emissions at the time of changing the combustion power are largely reduced as shown by solid line in FIG. 15C. In FIG. 15C, a broken line represents a variation of HC emissions in the prior art, wherein the foregoing timing control is not performed, that is, the fuel supply amount change and the air supply amount change are performed simultaneously.

FIG. 16 shows a flowchart of a control routine to be executed by the ECU 6 for controlling the fuel supply amount and the air supply amount during the initial stage of the combustion and the steady combustion.

First, the control routine for the initial stage of the combustion prior to the steady combustion will be explained.

At step 1, a given small amount of the combustion air necessary for the ignition is supplied into the mixture tube 21. Subsequently, the glow plug 9 is energized at step 2, and an amount of the fuel necessary for the ignition is supplied to the vaporization plate 4 at step 3. Step 4 determines whether the ignition is achieved. If the answer at step 4 is negative, the routine returns to step 1. On the other hand, if the answer at step 4 is positive, the routine proceeds to step 5 where the energization of the glow plug 9 is stopped.

At step 6, it is determined whether a time period t3 (1 minute in this preferred embodiment) has elapsed from the ignition. The time period t3 is determined so as to represent a proper time period for increasing the combustion power to the next step. If t3 has elapsed at step 6, step 7 increases the fuel supply amount to a level necessary for the combustion at the second step. Subsequently, step 8 determines whether t0 (3 seconds) has elapsed after the fuel supply amount increment achieved at step 7. If t0 has elapsed at step 8, the routine proceeds to step 9 where the air supply amount is increased to a level necessary for the combustion at the second step. Practically, steps 6 to 9 are repeated until the target combustion power, i.e. the steady combustion is reached or achieved.

Now, the control routine during the steady combustion will be explained.

At step 11, it is determined whether to increase the combustion power. If the answer at step 11 is negative, the routine proceeds to step 15 which determines whether to decrease the combustion power. If the answer at step 15 is negative, the routine returns to step 11. On the other hand, if the answer at step 11 is positive to increase the combustion power, the fuel supply amount is increased at step 12. Subsequently, step 13 determines whether t1 (3 seconds) has elapsed after the fuel supply amount increment achieved at step 12. If t1 has elapsed at step 13, step 14 increases the air supply amount to a level corresponding to the increased fuel supply amount. On the other hand, if the answer at step 15 is positive to decrease the combustion power, step 16 decreases the fuel supply amount. Subsequently, step 17 determines whether t2 (3 seconds) has elapsed after the fuel supply amount decrement achieved at step 16. If t2 has elapsed at step 17, step 18 decreases the air supply amount to a level corresponding to the decreased fuel supply amount.

As appreciated, the fuel supply amount decreasing control at the time of extinction may be performed as in the first, third, fifth, sixth, seventh, eighth or ninth embodiment. The fuel supply amount decreasing control starts to be executed by the ECU 6 in response to the aforementioned combustion stop signal.

Now, an eleventh embodiment of the present invention will be described hereinbelow.

The eleventh embodiment differs from the foregoing tenth embodiment in the air supply amount control during the steady combustion.

Figures 17A, 17B, 18A, 18B:
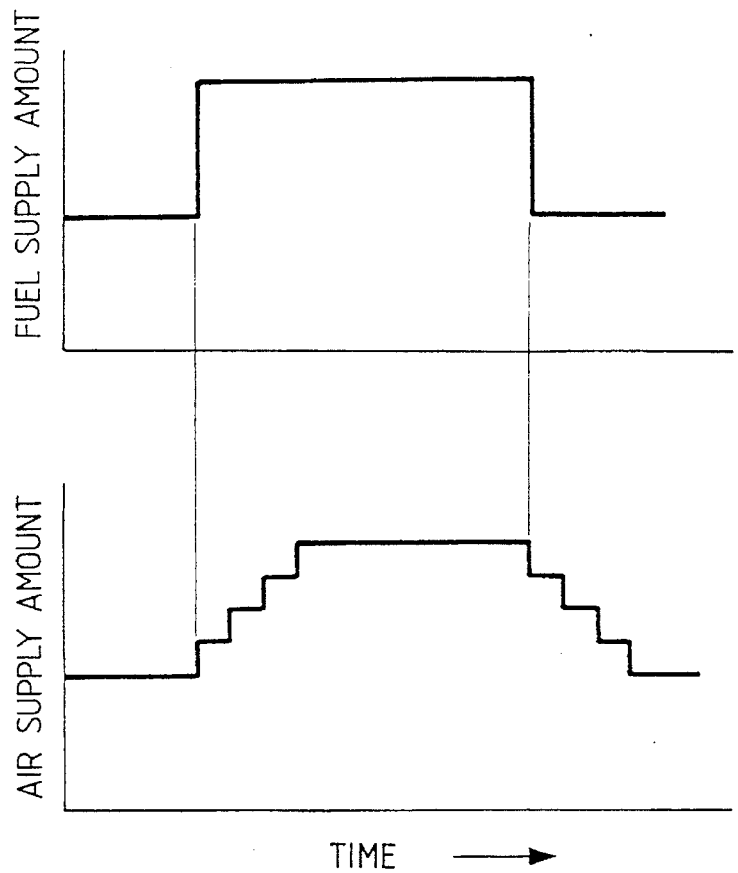
FIGS. 17A and 17B are diagrams, respectively, showing time-domain variations of a fuel supply amount and an air supply amount during a steady combustion according to an eleventh embodiment of the present invention.
FIGS. 18A and 18B are diagrams, respectively, showing time-domain variations of a fuel supply amount and an air supply amount during a steady combustion according to a twelfth embodiment of the present invention.

Specifically, in the eleventh embodiment, the delayed air supply amount change relative to the fuel supply amount change performed in the tenth preferred embodiment during the steady combustion is performed stepwise as shown in FIGS. 17A and 17B.

The other structure is the same as that in the foregoing tenth preferred embodiment.

This arrangement is further effective for preventing deterioration of the exhaust gas emissions.

Like the tenth embodiment, the fuel supply amount decreasing control at the time of extinction may be performed as in the first, third, fifth, sixth, seventh, eighth or ninth embodiment.

Now, a twelfth embodiment of the present invention will be described hereinbelow.

The twelfth embodiment differs from the foregoing tenth embodiment in the air supply amount control during the steady combustion.

Specifically, in the twelfth embodiment, the delayed air supply amount change relative to the fuel supply amount change performed in the tenth embodiment during the steady combustion is performed along inclined lines rather than the vertical lines, as shown in FIGS. 18A and 18B.

The other structure is the same as that in the foregoing tenth embodiment.

This arrangement is also effective for preventing deterioration of the exhaust gas emissions.

Like the tenth embodiment, the fuel supply amount decreasing control at the time of extinction may be performed as in the first, third, fifth, sixth, seventh, eighth or ninth embodiment.

Now, a thirteenth embodiment of the present invention will be described hereinbelow.

The thirteenth embodiment differs from the foregoing tenth embodiment in the fuel supply amount control during the steady combustion.

Specifically, in the thirteenth embodiment, as shown in FIGS. 19A and 19B, the fuel supply amount change is first performed stepwise until the fuel supply amount reaches a preset value. After the preset value is reached, the air supply amount change is performed along the vertical line as in the foregoing tenth embodiment.

The other structure is the same as that in the tenth embodiment.

This arrangement is also effective for preventing deterioration of the exhaust gas emissions.

Like the tenth embodiment, the fuel supply amount decreasing control at the time of extinction may be performed as in the first, third, fifth, sixth, seventh, eighth or ninth embodiment.

Now, a fourteenth embodiment of the present invention will be described hereinbelow.

The fourteenth embodiment differs from the foregoing tenth embodiment in the fuel supply amount control during the steady combustion.

Specifically, in the fourteenth embodiment, as shown in FIGS. 20A and 20B, the fuel supply amount change is first performed along an inclined line until the fuel supply amount reaches a preset value. After the preset value is reached, the air supply amount change is performed along the vertical line as in the foregoing tenth embodiment.

The other structure is the same as that in the tenth embodiment.

This arrangement is also effective for preventing deterioration of the exhaust gas emissions.

Like the tenth embodiment, the fuel supply amount decreasing control at the time of extinction may be performed as in the first, third, fifth, sixth, seventh, eighth or ninth embodiment.

Now, a fifteenth embodiment of the present invention will be described hereinbelow.

Figure 21:
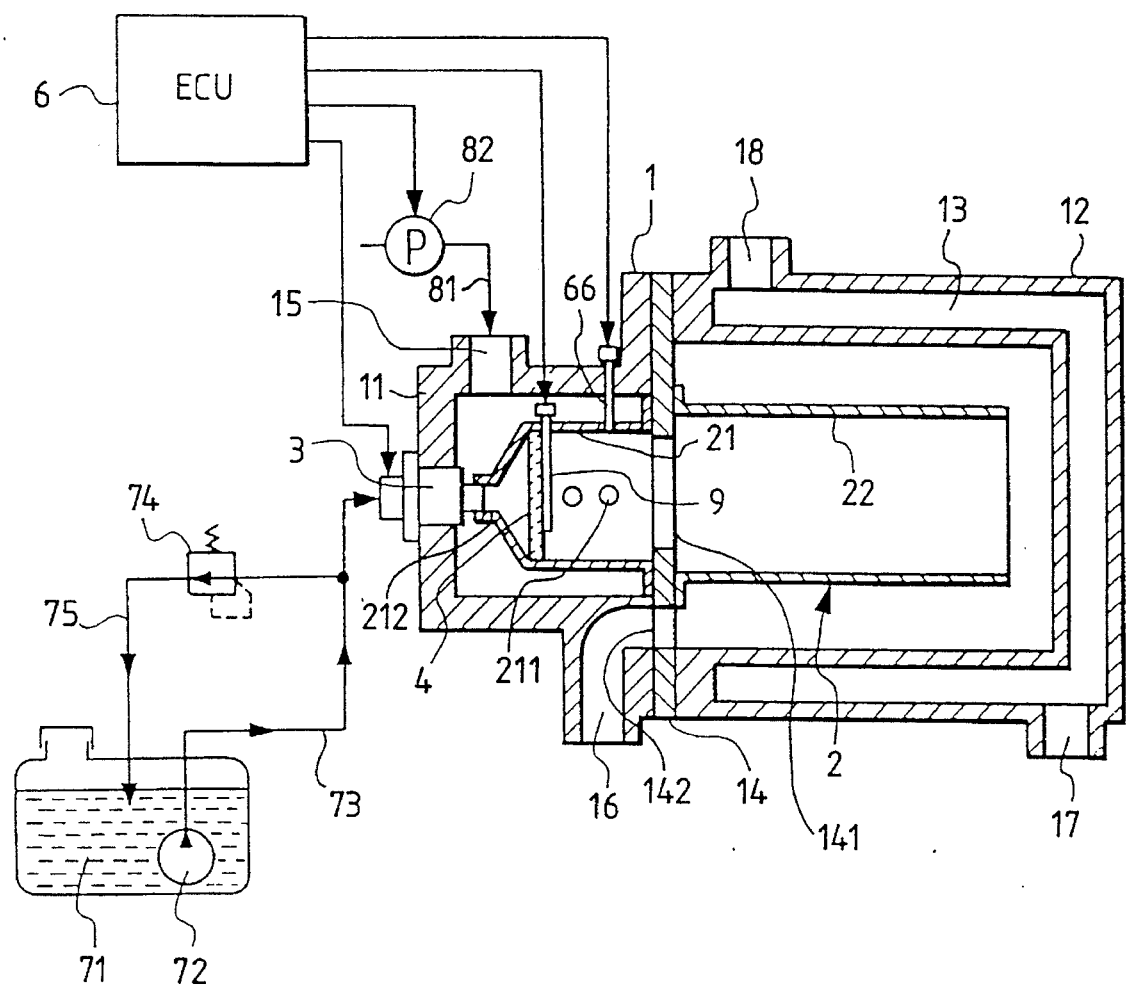
FIG. 21 is a sectional view showing the overall structure of a combustion heater to be used in a fifteenth embodiment of the present invention.

FIG. 21 is a sectional view showing a combustion heater to be used in the fifteenth embodiment, wherein the same or like elements are designated by the same reference numerals as those in FIG. 7 so as to omit explanation thereof as much as possible to avoid redundant disclosure. As appreciated, the combustion heater shown in FIG. 7 is used in the foregoing fifth and tenth to fourteenth embodiments.

The combustion heater shown in FIG. 21 is the same as that shown in FIG. 7 except that a temperature sensor 66 is additionally provided. In FIG. 21, the temperature sensor 66 penetrates an upper wall portion of the housing half 11 to reach a circumferential wall of the mixture tube 21. The vaporization speed of the fuel is increased as the temperature in the mixture tube 21 is increased. Accordingly, by changing the air supply delay time depending on a mixture tube wall temperature, detected by the temperature sensor 66, indicative of the temperature in the mixture tube 21, the air supply control which more reflects the actual fuel supply amount change, can be achieved so as to further improve the exhaust gas emissions.

Figure 22:
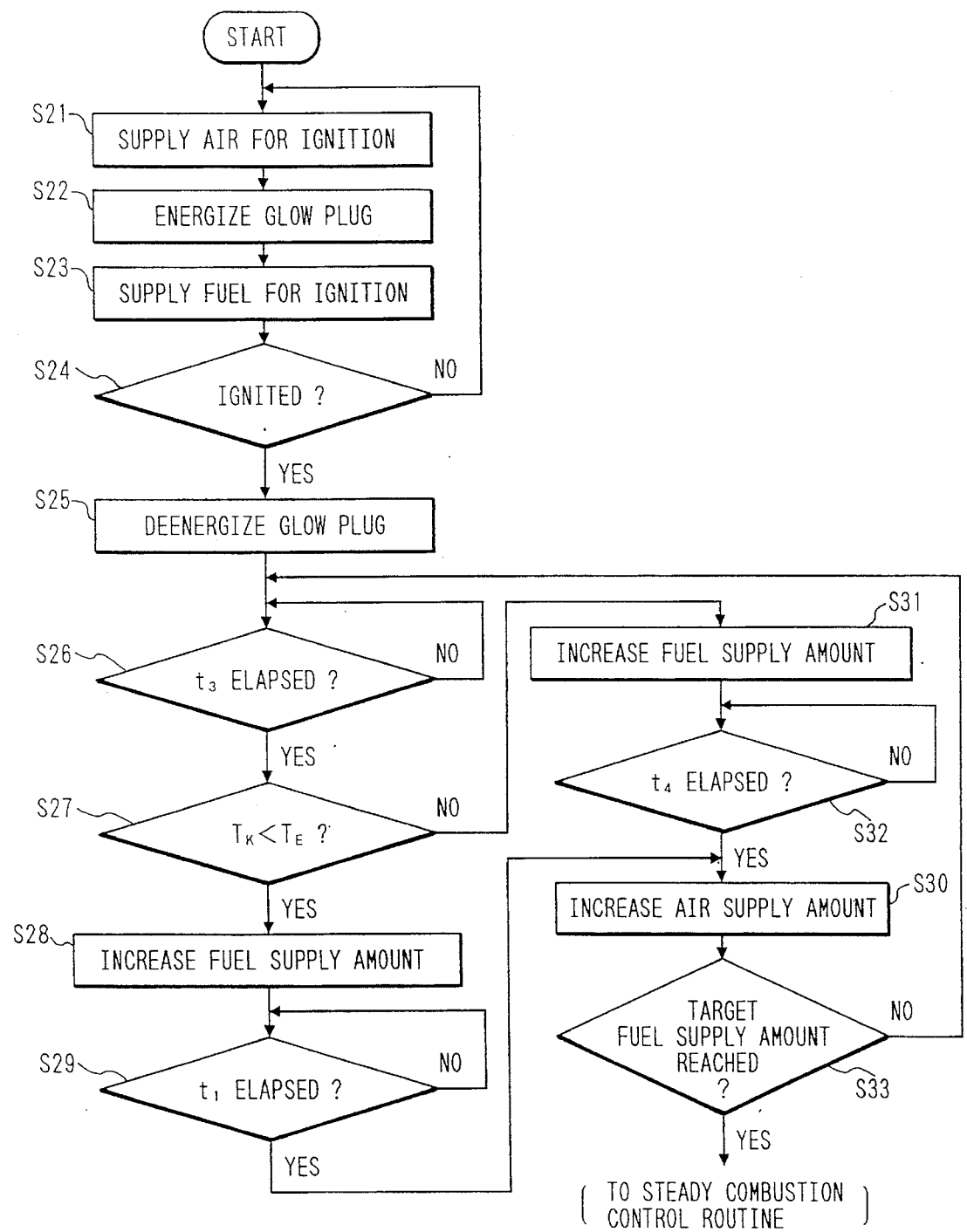
FIG. 22 is a flowchart showing a control routine for controlling a fuel supply amount and an air supply amount during an initial stage of combustion.

FIG. 22 shows a flowchart of a control routine to be executed by the ECU 6 for controlling the fuel supply amount and the air supply amount at the time of ignition, i.e. during the initial stage of the combustion prior to the steady combustion.

At step 21, a given small amount of the combustion air necessary for the ignition is supplied into the mixture tube 21. Subsequently, the glow plug 9 is energized at step 22, and an amount of the fuel necessary for the ignition is supplied to the vaporization plate 4 at step 23. Step 24 determines whether the ignition is achieved. If answer at step 24 is negative, the routine returns to step 21. On the other hand, if answer at step 24 is positive, the routine proceeds to step 25 where the energization of the glow plug 9 is stopped.

At step 26, it is determined whether a time period t3 (1 minute) has elapsed from the ignition. The time period t3 is determined so as to represent a proper time period for increasing the combustion power to the next step. If t3 has elapsed at step 26, step 27 determines whether a mixture tube wall temperature Tk is small than a threshold temperature TE (300° C.). If Tk<TE, step 28 increases the fuel supply amount to a level necessary for the combustion at the second step. Subsequently, step 29 determines whether t1 (3 seconds) has elapsed after the fuel supply amount increment achieved at step 28. If t1 has elapsed at step 29, the routine proceeds to step 30 where the air supply amount is increased to a level necessary for the combustion at the second step.

On the other hand, if Tk≧TE, step 31 increases the fuel supply amount to a level necessary for the combustion at the second step. Subsequently, step 32 determines whether t4 (1 second) has elapsed after the fuel supply amount increment achieved at step 31. If t4 has elapsed at step 32, the routine proceeds to step 30 where the air supply amount is increased to a level necessary for the combustion at the second step. Subsequently, step 33 determines whether the fuel supply amount reaches a target fuel supply amount. If the answer at step 33 is negative, the routine returns to step 26. On the other hand, if answer at step 33 is positive, the routine proceeds step 11 in FIG. 16 so as to execute the control routine for the steady combustion in the same manner as in the foregoing tenth embodiment.

Like the tenth embodiment, the fuel supply amount decreasing control at the time of extinction may be performed as in the first, third, fifth, sixth, seventh, eighth or ninth embodiment.

It is to be understood that this invention is not to be limited to the embodiments and modifications described above, and that various changes and modifications may be made without departing from the spirit and scope of the invention as defined in the appended claims.

What is claimed is:

1. A combustion heater having a burner in a housing provided with a fluid passage for heating a fluid introduced in said fluid passage, said combustion heater comprising:

fuel feed means for supplying a fuel to said burner:

air feed means for supplying combustion air to said burner depending on a fuel supply amount from said fuel feed means;

ignition means for igniting said fuel supplied to said burner;

fuel supply amount setting means for increasing an amount of said fuel supplied from said fuel feed means in a stepwise fashion during a time period from ignition of said supplied fuel by said ignition means to generation of a given heat quantity by said burner; and combustion control means which, at a time of extinction in said burner, reduces said fuel supply amount from said fuel feed means and an air supply amount from said air feed means to given values, respectively, and holds said fuel supply amount and an air supply amount at said given values for a given time period, said combustion control means, after lapse of said given time period, stopping said fuel supply from said fuel feed means while holding said air supply amount at said given value for a further given time period.

2. A combustion heater having a burner in a housing provided with a fluid passage for heating a fluid introduced in said fluid passage, said combustion heater comprising:

fuel feed means for supplying a fuel to said burner:

air feed means for supplying combustion air to said burner depending on a fuel supply amount from said fuel feed means;

ignition means for igniting said fuel supplied to said burner; and fuel supply amount setting means for increasing an amount of said fuel supplied from said fuel feed means in a stepwise fashion during a time period from ignition of said supplied fuel by said ignition means to generation of a given heat quantity by said burner; wherein said fuel supply amount setting means increases stepwise said fuel supply amount from said fuel feed means using different fuel increasing amounts, and wherein said fuel supply amount setting means increases said fuel increasing amounts corresponding to increments of heat quantities generated by said burner at respective time points when said fuel supply amount setting means increases said fuel supply amount from said fuel feed means.

3. A combustion heater having a burner in a housing provided with a fluid passage for heating a fluid introduced in said fluid passage, said combustion heater comprising:

fuel feed means for supplying a fuel to said burner:

air feed means for supplying combustion air to said burner depending on a fuel supply amount from said fuel feed means;

ignition means for igniting said fuel supplied to said burner; and fuel supply amount setting means for increasing an amount of said fuel supplied from said fuel feed means in a stepwise fashion during a time period from ignition of said supplied fuel by said ignition means to generation of a given heat quantity by said burner, wherein said fuel supply amount setting means increases stepwise said fuel supply amount from said fuel feed means using different fuel increasing periods, and wherein said fuel supply amount setting means shortens said fuel increasing periods corresponding to increments of heat quantities generated by said burner at respective time points when said fuel supply amount setting means increases said fuel supply amount from said fuel feed means.

4. A combustion heater having a burner in a housing provided with a fluid passage for heating a fluid introduced in said fluid passage, said combustion heater comprising:

fuel feed means for supplying a fuel to said burner;

air feed means for supplying combustion air to said burner depending on a fuel supply amount from said fuel feed means;

ignition means for igniting said fuel supplied to said burner; and fuel supply amount setting means for decreasing said fuel supply amount from said fuel feed means in a stepwise fashion at a time of extinction of combustion in said burner; and air supply amount control means for changing an air supply amount from said air feed means with a given time delay relative to a change of said fuel supply amount from said fuel feed means, wherein said air supply amount control means changes said air supply amount with said given time delay during a steady combustion in said burner.

5. The combustion heater as set forth in claim 4, wherein said air supply amount control means increases said air supply amount from said air feed means with said given time delay relative to an increment of said fuel supply amount from said fuel feed means, and wherein said air supply amount control means decreases said air supply amount from said air feed means with said given time delay relative to a decrement of said fuel supply amount from said fuel feed means.

6. A combustion heater having a burner in a housing provided with a fluid passage for heating a fluid introduced in said fluid passage, said combustion heater comprising:

a vaporization member for vaporizing a fuel;

fuel feed means for supplying said fuel to said vaporization member;

air feed means for supplying combustion air to said burner; and combustion control means for controlling combustion in said burner, said combustion control means, at a time of extinction of combustion in said burner, reducing a fuel supply amount from said fuel feed means and an air supply amount from said air feed means to given values, respectively, and holding said fuel supply amount and said air supply amount at said given values for a given time period, said combustion control means, after lapse of said given time period, stopping said fuel supply from said fuel feed means while holding said air supply amount at said given value for a further given time period.

7. The combustion heater as set forth in claim 6, wherein said combustion control means, after lapse of said further given time period, increases said air supply amount and holds said increased air supply amount for a given time period.

8. The combustion heater as set forth in claim 6, wherein said combustion control means, after lapse of said further given time period, reduces said air supply amount gradually to zero.

9. The combustion heater as set forth in claim 8, wherein said combustion control means, after reducing said air supply amount gradually to zero, increases said air supply amount and holds said increased air supply amount for a given time period.

10. The combustion heater as set forth in claim 6, wherein heating means is provided for heating said vaporization member, and wherein heating control means is provided for activating said heating means for a given time period after said combustion control means reduces said fuel supply amount and said air supply amount to said given values, respectively.

11. A combustion heater having a burner in a housing provided with a fluid passage for heating a fluid introduced in said fluid passage, said combustion heater comprising:

fuel feed means for supplying a fuel;

a vaporization member for vaporizing said fuel from said fuel feed means for a supply into a burner tube of said burner;

air feed means for supplying combustion air into said burner tube; and air supply amount control means for changing an air supply amount from said air feed means with a given time delay relative to a change of a fuel supply amount from said fuel feed means.

12. The combustion heater as set forth in claim 11, wherein said air supply amount control means changes said air supply amount from said air feed means with said given time delay during a state of steady combustion in said burner, wherein said air supply amount control means increases said air supply amount from said air feed means with said given time delay relative to an increment of said fuel supply amount from said fuel feed means, and wherein said air supply amount control means decreases said air supply amount from said air feed means with said given time delay relative to a decrement of said fuel supply amount from said fuel feed means.

13. The combustion heater as set forth in claim 11, wherein said air supply amount control means adjusts said time delay depending on a temperature in said burner tube.

* * * * *